US008280011B2

(12) United States Patent
Calahan et al.

(10) Patent No.: US 8,280,011 B2
(45) Date of Patent: Oct. 2, 2012

(54) RECORDING IN A DISTRIBUTED ENVIRONMENT

(75) Inventors: Marc Calahan, Woodstock, GA (US); Mark Edmund Coleman, New York, NY (US)

(73) Assignee: Verint Americas, Inc., Roswell, GA (US)

( * ) Notice: Subject to any disclaimer, the term of this patent is extended or adjusted under 35 U.S.C. 154(b) by 1454 days.

(21) Appl. No.: 11/608,350

(22) Filed: Dec. 8, 2006

(65) Prior Publication Data
US 2008/0137820 A1    Jun. 12, 2008

(51) Int. Cl.
*H04M 3/22* (2006.01)
(52) U.S. Cl. .............. 379/35; 370/352; 379/50; 379/68; 379/86; 379/93.01; 379/211.01; 455/414.1; 455/417; 709/203; 709/205; 709/224
(58) Field of Classification Search .... 348/14.01–14.16; 370/259–271, 351–356; 379/37–51, 67.1–88.28, 379/201.01, 32.01–52, 93.01–93.04, 112.01, 379/133–134, 142.01, 202.01, 207.01, 211.01; 704/270–278; 709/201–207, 217–248; 455/412.1–417, 426.1, 426.2, 550.1–560
See application file for complete search history.

(56) References Cited

U.S. PATENT DOCUMENTS

| | | | |
|---|---|---|---|
| 3,594,919 A | 7/1971 | De Bell et al. |
| 3,705,271 A | 12/1972 | De Bell et al. |
| 4,510,351 A | 4/1985 | Costello et al. |
| 4,684,349 A | 8/1987 | Ferguson et al. |
| 4,694,483 A | 9/1987 | Cheung |
| 4,763,353 A | 8/1988 | Canale et al. |
| 4,815,120 A | 3/1989 | Kosich |
| 4,924,488 A | 5/1990 | Kosich |
| 4,953,159 A | 8/1990 | Hayden et al. |
| 5,016,272 A | 5/1991 | Stubbs et al. |
| 5,101,402 A | 3/1992 | Chiu et al. |
| 5,117,225 A | 5/1992 | Wang |
| 5,210,789 A | 5/1993 | Jeffus et al. |
| 5,239,460 A | 8/1993 | LaRoche |
| 5,241,625 A | 8/1993 | Epard et al. |
| 5,267,865 A | 12/1993 | Lee et al. |
| 5,299,260 A | 3/1994 | Shaio |
| 5,311,422 A | 5/1994 | Loftin et al. |

(Continued)

FOREIGN PATENT DOCUMENTS

EP    0453128 A2    10/1991

(Continued)

OTHER PUBLICATIONS

Notification of Transmittal of the International Search Report and the Written Opinion of the International Searching Authority, dated Jun. 13, 2008.

(Continued)

*Primary Examiner* — Hemant Patel
(74) *Attorney, Agent, or Firm* — McKeon, Meunier, Carlin & Curfman

(57) ABSTRACT

Included are embodiments for recording data from a communication. A least one embodiment includes a system for recording data from a communication that includes a controller component and a gateway component passively coupled to a switching component. In at least one embodiment the gateway component configured to receive at least a portion of the control data, the gateway component further configured to receive media data associated with the with the communication.

22 Claims, 14 Drawing Sheets

U.S. PATENT DOCUMENTS

| | | |
|---|---|---|
| 5,315,711 A | 5/1994 | Barone et al. |
| 5,317,628 A | 5/1994 | Misholi et al. |
| 5,347,306 A | 9/1994 | Nitta |
| 5,388,252 A | 2/1995 | Dreste et al. |
| 5,396,371 A | 3/1995 | Henits et al. |
| 5,432,715 A | 7/1995 | Shigematsu et al. |
| 5,465,286 A | 11/1995 | Clare et al. |
| 5,475,625 A | 12/1995 | Glaschick |
| 5,485,569 A | 1/1996 | Goldman et al. |
| 5,491,780 A | 2/1996 | Fyles et al. |
| 5,499,291 A | 3/1996 | Kepley |
| 5,535,256 A | 7/1996 | Maloney et al. |
| 5,572,652 A | 11/1996 | Robusto et al. |
| 5,577,112 A | 11/1996 | Cambray et al. |
| 5,590,171 A | 12/1996 | Howe et al. |
| 5,597,312 A | 1/1997 | Bloom et al. |
| 5,619,183 A | 4/1997 | Ziegra et al. |
| 5,696,906 A | 12/1997 | Peters et al. |
| 5,717,879 A | 2/1998 | Moran et al. |
| 5,721,842 A | 2/1998 | Beasley et al. |
| 5,742,670 A | 4/1998 | Bennett |
| 5,748,499 A | 5/1998 | Trueblood |
| 5,778,182 A | 7/1998 | Cathey et al. |
| 5,784,452 A | 7/1998 | Carney |
| 5,790,798 A | 8/1998 | Beckett, II et al. |
| 5,796,952 A | 8/1998 | Davis et al. |
| 5,809,247 A | 9/1998 | Richardson et al. |
| 5,809,250 A | 9/1998 | Kisor |
| 5,825,869 A | 10/1998 | Brooks et al. |
| 5,835,572 A | 11/1998 | Richardson, Jr. et al. |
| 5,862,330 A | 1/1999 | Anupam et al. |
| 5,864,772 A | 1/1999 | Alvarado et al. |
| 5,884,032 A | 3/1999 | Bateman et al. |
| 5,907,680 A | 5/1999 | Nielsen |
| 5,918,214 A | 6/1999 | Perkowski |
| 5,923,746 A * | 7/1999 | Baker et al. ............. 379/265.02 |
| 5,933,811 A | 8/1999 | Angles et al. |
| 5,944,791 A | 8/1999 | Scherpbier |
| 5,948,061 A | 9/1999 | Merriman et al. |
| 5,958,016 A | 9/1999 | Chang et al. |
| 5,964,836 A | 10/1999 | Rowe et al. |
| 5,978,648 A | 11/1999 | George et al. |
| 5,982,857 A * | 11/1999 | Brady ........................ 379/88.19 |
| 5,987,466 A | 11/1999 | Greer et al. |
| 5,990,852 A | 11/1999 | Szamrej |
| 5,991,373 A | 11/1999 | Pattison et al. |
| 5,991,796 A | 11/1999 | Anupam et al. |
| 6,005,932 A | 12/1999 | Bloom |
| 6,009,429 A | 12/1999 | Greer et al. |
| 6,014,134 A | 1/2000 | Bell et al. |
| 6,014,647 A | 1/2000 | Nizzari et al. |
| 6,018,619 A | 1/2000 | Allard et al. |
| 6,035,332 A | 3/2000 | Ingrassia et al. |
| 6,038,544 A | 3/2000 | Machin et al. |
| 6,039,575 A | 3/2000 | L'Allier et al. |
| 6,057,841 A | 5/2000 | Thurlow et al. |
| 6,058,163 A | 5/2000 | Pattison et al. |
| 6,061,798 A | 5/2000 | Coley et al. |
| 6,072,860 A * | 6/2000 | Kek et al. .................... 379/88.25 |
| 6,076,099 A | 6/2000 | Chen et al. |
| 6,078,894 A | 6/2000 | Clawson et al. |
| 6,091,712 A | 7/2000 | Pope et al. |
| 6,108,711 A | 8/2000 | Beck et al. |
| 6,122,665 A * | 9/2000 | Bar et al. ....................... 709/224 |
| 6,122,668 A | 9/2000 | Teng et al. |
| 6,125,111 A | 9/2000 | Snow et al. |
| 6,130,668 A | 10/2000 | Stein |
| 6,138,139 A | 10/2000 | Beck et al. |
| 6,144,991 A | 11/2000 | England |
| 6,146,148 A | 11/2000 | Stuppy |
| 6,151,622 A | 11/2000 | Fraenkel et al. |
| 6,154,771 A | 11/2000 | Rangan et al. |
| 6,157,808 A | 12/2000 | Hollingsworth |
| 6,171,109 B1 | 1/2001 | Ohsuga |
| 6,182,094 B1 | 1/2001 | Humpleman et al. |
| 6,195,679 B1 | 2/2001 | Bauersfeld et al. |
| 6,201,948 B1 | 3/2001 | Cook et al. |
| 6,211,451 B1 | 4/2001 | Tohgi et al. |
| 6,225,993 B1 | 5/2001 | Lindblad et al. |
| 6,230,197 B1 | 5/2001 | Beck et al. |
| 6,236,977 B1 | 5/2001 | Verba et al. |
| 6,244,758 B1 | 6/2001 | Solymar et al. |
| 6,282,548 B1 | 8/2001 | Burner et al. |
| 6,286,030 B1 * | 9/2001 | Wenig et al. .................. 709/203 |
| 6,286,046 B1 | 9/2001 | Bryant |
| 6,288,753 B1 | 9/2001 | DeNicola et al. |
| 6,289,340 B1 | 9/2001 | Purnam et al. |
| 6,301,462 B1 | 10/2001 | Freeman et al. |
| 6,301,573 B1 | 10/2001 | McIlwaine et al. |
| 6,324,282 B1 | 11/2001 | McIlwaine et al. |
| 6,347,374 B1 | 2/2002 | Drake et al. |
| 6,351,467 B1 | 2/2002 | Dillon |
| 6,353,851 B1 | 3/2002 | Anupam et al. |
| 6,360,250 B1 | 3/2002 | Anupam et al. |
| 6,404,857 B1 * | 6/2002 | Blair et al. ..................... 379/67.1 |
| 6,411,989 B1 | 6/2002 | Anupam et al. |
| 6,418,471 B1 | 7/2002 | Shelton et al. |
| 6,459,787 B2 | 10/2002 | McIlwaine et al. |
| 6,487,195 B1 | 11/2002 | Choung et al. |
| 6,493,758 B1 | 12/2002 | McLain |
| 6,502,131 B1 | 12/2002 | Vaid et al. |
| 6,510,220 B1 | 1/2003 | Beckett, II et al. |
| 6,535,909 B1 | 3/2003 | Rust |
| 6,542,602 B1 | 4/2003 | Elazar |
| 6,546,405 B2 | 4/2003 | Gupta et al. |
| 6,560,328 B1 | 5/2003 | Bondarenko et al. |
| 6,583,806 B2 | 6/2003 | Ludwig et al. |
| 6,606,657 B1 | 8/2003 | Zilberstein et al. |
| 6,665,644 B1 | 12/2003 | Kanevsky et al. |
| 6,674,447 B1 | 1/2004 | Chiang et al. |
| 6,697,858 B1 | 2/2004 | Ezerzer et al. |
| 6,724,887 B1 | 4/2004 | Eilbacher et al. |
| 6,738,456 B2 * | 5/2004 | Wrona et al. ..................... 379/37 |
| 6,757,361 B2 | 6/2004 | Blair et al. |
| 6,772,396 B1 | 8/2004 | Cronin et al. |
| 6,775,377 B2 | 8/2004 | McIlwaine et al. |
| 6,792,575 B1 | 9/2004 | Samaniego et al. |
| 6,810,414 B1 | 10/2004 | Brittain |
| 6,820,083 B1 | 11/2004 | Nagy et al. |
| 6,823,384 B1 | 11/2004 | Wilson et al. |
| 6,839,323 B1 * | 1/2005 | Foti ................................ 370/235 |
| 6,870,916 B2 | 3/2005 | Henrikson et al. |
| 6,901,438 B1 | 5/2005 | Davis et al. |
| 6,959,078 B1 | 10/2005 | Eilbacher et al. |
| 6,965,886 B2 | 11/2005 | Govrin et al. |
| 7,027,437 B1 | 4/2006 | Merchant et al. |
| 7,151,772 B1 * | 12/2006 | Kalmanek et al. ............. 370/390 |
| 7,277,528 B2 * | 10/2007 | Rao et al. .................... 379/32.01 |
| 7,535,993 B2 * | 5/2009 | Cai et al. .......................... 379/45 |
| 7,634,571 B2 * | 12/2009 | Fertell et al. .................. 709/227 |
| 2001/0000962 A1 | 5/2001 | Rajan |
| 2001/0032335 A1 | 10/2001 | Jones |
| 2001/0043697 A1 | 11/2001 | Cox et al. |
| 2002/0006187 A1 | 1/2002 | Lukas |
| 2002/0038363 A1 | 3/2002 | MacLean |
| 2002/0052948 A1 | 5/2002 | Baudu et al. |
| 2002/0065911 A1 | 5/2002 | Von Klopp et al. |
| 2002/0065912 A1 | 5/2002 | Catchpole et al. |
| 2002/0075809 A1 | 6/2002 | Phaal et al. |
| 2002/0126674 A1 | 9/2002 | Hemmady |
| 2002/0128925 A1 | 9/2002 | Angeles |
| 2002/0143925 A1 | 10/2002 | Pricer et al. |
| 2002/0165954 A1 | 11/2002 | Eshghi et al. |
| 2003/0055883 A1 | 3/2003 | Wiles et al. |
| 2003/0079020 A1 | 4/2003 | Gourraud et al. |
| 2003/0144900 A1 | 7/2003 | Whitmer |
| 2003/0154240 A1 | 8/2003 | Nygren et al. |
| 2003/0174695 A1 * | 9/2003 | Lautenschlager et al. .... 370/352 |
| 2003/0190032 A1 * | 10/2003 | Ravishankar ................. 379/229 |
| 2003/0200311 A1 * | 10/2003 | Baum ............................ 709/224 |
| 2004/0008724 A1 * | 1/2004 | Devine et al. ................. 370/466 |
| 2004/0100507 A1 | 5/2004 | Hayner et al. |
| 2004/0165717 A1 | 8/2004 | McIlwaine et al. |
| 2005/0085218 A1 | 4/2005 | Clayton |
| 2005/0138560 A1 | 6/2005 | Lee et al. |
| 2005/0203989 A1 | 9/2005 | Dellacona |

| | | | | |
|---|---|---|---|---|
| 2006/0212933 | A1* | 9/2006 | Scoggins et al. | 726/11 |
| 2006/0268847 | A1 | 11/2006 | Halbraich et al. | |
| 2007/0263794 | A1* | 11/2007 | Mocenigo | 379/67.1 |

FOREIGN PATENT DOCUMENTS

| | | |
|---|---|---|
| EP | 0773687 A2 | 5/1997 |
| GB | 2369263 | 5/2002 |
| WO | WO 98/43380 | 11/1998 |
| WO | WO 00/16207 | 3/2000 |

OTHER PUBLICATIONS

"Customer Spotlight: Navistar International," Web pae, unverified print date of Apr. 1, 2002.
"DKSystems Integrates QM Perception with OnTrack for Training," Web page, unvereified print date of Apr. 1, 2002, unverified cover date of Jun. 15, 1999.
"OnTrack Online" Delivers New Web Functionality, Web page, unverified print date of Apr. 2, 2002, unverified cover date of Oct. 5, 1999.
"PriceWaterouseCoopers Case Study" The Business Challenge, Web page, unverified cover date of 2000.
Abstract, net.working: "An Online Webliography," *Technical Training* pp. 4-5 (Nov.-Dec. 1998).
Adams et al., "Our Turn-of-the-Century Trend Watch" *Technical Training* pp. 46-47 (Nov./Dec. 1998).
Barron, "The Road to Performance: Three Vignettes," *Technical Skills and Training* pp. 12-14 (Jan. 1997).
Bauer, "Technology Tools: Just-in-Time Desktop Training is Quick, Easy, and Affordable," *Technical Training* pp. 8-11 (May/Jun. 1998).
Beck et al., "Applications of A1 in Education," *AMC Crossroads* vol. 1: 1-13 (Fall 1996) Web page, unverified print date of Apr. 12, 2002.
Benson and Cheney, "Best Practices in Training Delivery," *Technical Training* pp. 14-17 (Oct. 1996).
Bental and Cawsey, "Personalized and Adaptive Systems for Medical Consumer Applications," Communications ACM 45(5): 62-63 (May 2002).
Benyon and Murray, "Adaptive Systems: from intelligent tutoring to autonomous agents," pp. 1-52, Web page, unknown date.
Blumenthal et al., "Reducing Development Costs with Intelligent Tutoring System Shells," pp. 1-5, Web page, unverified print date of Apr. 9, 2002, unverified cover date of Jun. 10, 1996.
Brusilosy et al., "Distributed intelligent tutoring on the Web," Proceedings of the 8th World Conference of the AIED Society, Kobe, Japan, Aug. 18-22, pp. 1-9 Web page, unverified print date of Apr. 12, 2002, unverified cover date of Aug. 18-22, 1997.
Brusilovsky and Pesin, ISIS-Tutor: An Intelligent Learning Environment for CD/ISIS Users, @ pp. 1-15 Web page, unverified print date of May 2, 2002.
Brusilovsky, "Adaptive Educational Systems on the World-Wide-Web: A Review of Available Technologies," pp. 1-10, Web Page, unverified print date of Apr. 12, 2002.
Byrnes et al., "The Development of a Multiple-Choice and True-False Testing Environment on the Web," pp. 1-8, Web page, unverified print date of Apr. 12, 2002, unverified cover date of 1995.
Calvi and DeBra, "Improving the Usability of Hypertext Courseware through Adaptive Linking," *ACM*, unknown page numbers (1997).
Coffey, "Are Performance Objectives Really Necessary?" *Technical Skills and Training* pp. 25-27 (Oct. 1995).
Cohen, "Knowledge Management's Killer App," pp. 1-11, Web page, unverified print date of Sep. 12, 2002, unverified cover date of 2001.
Cole-Gomolski, "New Ways to manage E-Classes," *Computerworld* 32(48):4344 (Nov. 30, 1998).
Cross: "Sun Microsystems—the SunTAN Story," Internet Time Group 8 (© 2001).
Cybulski and Linden, "Teaching Systems Analysis and Design Using Multimedia and Patterns," unknown date, unknown source.
De Bra et al., "Adaptive Hypermedia: From Systems to Framework," *ACM* (2000).
De Bra, "Adaptive Educational Hypermedia on the Web," *Communications ACM* 45(5):60-61 (May 2002).
Dennis and Gruner, "Computer Managed Instruction at Arthur Andersen & Company: A Status Report," *Educational Technical* pp. 7-16 (Mar. 1992).
Diessel et al., "Individualized Course Generation: A Marriage Between CAL and ICAL," *Computers Educational* 22(1/2) 57-65 (1994).
Dyreson, "An Experiment in Class Management Using the World-Wide Web," pp. 1-12, Web page, unverified print date of Apr. 12, 2002.
E Learning Community, "Excellence in Practice Award: Electronic Learning Technologies," *Personal Learning Network* pp. 1-11, Web page, unverified print date of Apr. 12, 2002.
Eklund and Brusilovsky, "The Value of Adaptivity in Hypermedia Learning Environments: A Short Review of Empirical Evidence," pp. 1-8, Web page, unverified print date of May 2, 2002.
*E-Learning the future of learning*, THINQ Limited, London, Version 1.0 (2000).
Eline, "A Trainer's Guide to Skill Building," *Technical Training* pp. 34-41 (Sep./Oct. 1998).
Eline, "Case Study: Briding the Gap in Canada's IT Skills," *Technical Skills and Training* pp. 23-25 (Jul. 1997).
Eline "Case Study: IBT's Place in the Sun," *Technical Training* pp. 12-17 (Aug./Sep. 1997).
Fritz, "CB templates for productivity: Authoring system templates for trainers," *Emedia Professional* 10(8):6678 (Aug. 1997).
Fritz, "ToolBook II: Asymetrix's updated authoring software tackles the Web," *Emedia Professional* 10(20): 102106 (Feb. 1997).
Gibson et al., "A Comparative Analysis of Web-Based Testing and Evaluation Systems," pp. 1-8, Web page, unverified print date of Apr. 11, 2002.
Halberg and DeFiore, "Curving Toward Performance: Following a Hierarchy of Steps Toward a Performance Orientation," *Technical Skills and Training* pp. 9-11 (Jan. 1997).
Harsha, "Online Training 'Sprints' Ahead," *Technical Training* pp. 27-29 (Jan./Feb. 1999).
Heideman, "Training Technicians for a High-Tech Future: These six steps can help develop technician training for high-tech work," pp. 11-14 (Feb./Mar. 1995).
Heideman, "Writing Performance Objectives Simple as A-B-C (and D)," *Technical Skills and Training* pp. 5-7 (May/Jun. 1996).
Hollman, "Train Without Pain: The Benefits of Computer-Based Training Tools," pp. 1-11, Web page, unverified print date of Mar. 20, 2002, unverified cover date of Jan. 1, 2000.
Klein, "Command Decision Training Support Technology," Web page, unverified print date of Apr. 12, 2002.
Koonce, "Where Technology and Training Meet," *Technical Training* pp. 10-15 (Nov./Dec. 1998).
Kursh, "Going the distance with Web-based training," *Training and Development* 52(3): 5053 (Mar. 1998).
Larson, "Enhancing Performance Through Customized Online Learning Support," *Technical Skills and Training* pp. 25-27 (May/Jun. 1997).
Linton, et al. "OWL: A Recommender System for Organization-Wide Learning," *Educational Technical Society* 3(1): 62-76 (2000).
Lucadamo and Cheney, "Best Practices in Technical Training," *Technical Training* pp. 21-26 (Oct. 1997).
McNamara, "Monitoring Solutions: Quality Must be Seen and Heard," *Inbound/Outbound* pp. 66-67 (Dec. 1989).
Merrill, "The New Component Design Theory: Instruction design for courseware authoring," *Instructional Science* 16:19-34 (1987).
Minton-Eversole, "IBT Training Truths Behind the Hype," *Technical Skills and Training* pp. 15-19 (Jan. 1997).
Mizoguchi, "Intelligent Tutoring Systems: The Current State of the Art," Trans. IEICE E73(3):297-307 (Mar. 1990).
Mostow and Aist, "The Sounds of Silence: Towards Automated Evaluation of Student Learning a Reading Tutor that Listens" *American Association for Artificial Intelligence*, Web page, unknown date Aug. 1997.
Mullier et al., "A Web base Intelligent Tutoring System," pp. 1-6, Web page, unverified print date of May 2, 2002.
Nash, Database Marketing, 1993, pp. 158-165, 172-185, McGraw Hill, Inc. USA.
Nelson et al. "The Assessment of *End-User Training Needs*," *Communications ACM* 38(7):27-39 (Jul. 1995).

O'Herron, "CenterForce Technologies' CenterForce Analyzer," Web page unverified print date of Mar. 2, 2002, unverified cover date of Jun. 1, 1999.

O'Roark, "Basic Skills Get a Boost," Technical Training pp. 10-13 (Jul./Aug. 1998).

Pamphlet, On Evaluating Educational Innovations[1], authored by Alan Lesgold, unverified cover date of Mar. 5, 1998.

Papa et al., "A Differential Diagnostic Skills Assessment and Tutorial Tool," *Computer Education* 18(1-3):45-50 (1992).

PCT International Search Report, International Application No. PCT/US03/02541, mailed May 12, 2003.

Phaup, "New Software Puts Computerized Tests on the Internet: Presence Corporation announces breakthrough Question Mark™ Web Product," Web page, unverified print date of Apr. 1, 2002.

Phaup, "QM Perception™ Links with Integrity Training's WBT Manager™ to Provide Enhanced Assessments of Web-Based Courses," Web page, unverified print date of Apr. 1, 2002, unverified cover date of Mar. 25, 1999.

Phaup, "Question Mark Introduces Access Export Software," Web page, unverified print date of Apr. 2, 2002, unverified cover date of Mar. 1, 1997.

Phaup, "Question Mark Offers Instant Online Feedback for Web Quizzes and Questionnaires: University of California assist with Beta Testing, Server scripts now available on high-volume users," Web page, unverified print date of Apr. 1, 2002, unverified cover date of May 6, 1996.

Piskurich, Now-You-See-'Em, Now-You-Don't Learning Centers, *Technical Training* pp. 18-21 (Jan./Feb. 1999).

Read, "Sharpening Agents' Skills," pp. 1-15, Web page, unverified print date of Mar. 20, 2002, unverified cover date of Oct. 1, 1999.

Reid, "On Target: Assessing Technical Skills," *Technical Skills and Training* pp. 6-8 (May/Jun. 1995).

Stormes, "Case Study: Restructuring Technical Training Using ISD," *Technical Skills and Training* pp. 23-26 (Feb./Mar. 1997).

Tennyson, "Artificial Intelligence Methods in Computer-Based Instructional Design," Journal of Instructional Development 7(3): 17-22 (1984).

The Editors, Call Center, "The Most Innovative Call Center Products We Saw in 1999," Web page, unverified print date of Mar. 20, 2002, unverified cover date of Feb. 1, 2000.

Tinoco et al., "Online Evaluation in WWW-based Courseware," *ACM* pp. 194-198 (1997).

Uiterwijk et al., "The virtual classroom," *InfoWorld* 20(47):6467 (Nov. 23, 1998).

Unknown Author, "Long-distance learning," *InfoWorld* 20(36):7676 (1998).

Untitled, 10th Mediterranean Electrotechnical Conference vol. 1 pp. 124-126 (2000).

Watson and Belland, "Use of Learner Data in Selecting Instructional Content for Continuing Education," *Journal of Instructional Development* 8(4):29-33 (1985).

Weinschenk, "Performance Specifications as Change Agents," *Technical Training* pp. 12-15 (Oct. 1997).

Witness Systems promotional brochure for eQuality entitled "Bringing eQuality to Business".

Witness Systems promotional brochure for eQuality entitled "Building Customer Loyalty Through Business-Driven Recording of Multimedia Interactions in your Contact Center," (2000).

Aspect Call Center Product Specification, "Release 2.0", Aspect Telecommuications Corporation, May 23, 1998 798.

Metheus X Window Record and Playback, XRP Features and Benefits, 2 pages Sep. 1994 LPRs.

"Keeping an Eye on Your Agents," Call Center Magazine, pp. 32-34, Feb. 1993 LPRs & 798.

Anderson: Interactive TVs New Approach, The Standard, Oct. 1, 1999.

Ante, *Everything You Ever Wanted to Know About Cryptography Legislation... (But Were to Sensible to Ask)*, PC world Online, Dec. 14, 1999.

Berst. *It's Baa-aack. How Interative TV is Sneaking Into Your Living Room*, The AnchorDesk, May 10, 1999.

Berst. *Why Interactive TV Won't Turn You on (Yet)*, The AnchorDesk, Jul. 13, 1999.

Borland and Davis. *US West Plans Web Services on TV*, CNETNews.com, Nov. 22, 1999.

Brown. *Let PC Technology Be Your TV Guide*, PC Magazine, Jun. 7, 1999.

Brown. *Interactive TV: The Sequel*, NewMedia, Feb. 10, 1998.

Cline. Déjà vu—*Will Interactive TV Make It This Time Around?*, DevHead, Jul. 9, 1999.

Crouch. *TV Channels on the Web*, PC World, Sep. 15, 1999.

D'Amico. *Interactive TV Gets $99 set-top box*, IDG.net, Oct. 6, 1999.

Davis. *Satellite Systems Gear Up for Interactive TV Fight*, CNETNews.com, Sep. 30, 1999.

Diederich. *Web TV Data Gathering Raises Privacy Concerns*, ComputerWorld, Oct. 13, 1998.

*Digital Broadcasting*, Interactive TV News.

*EchoStar, MediaX Mix Interactive Multimedia With Interactive Television*, PRNews Wire, Jan. 11, 1999.

Furger. *The Internet Meets the Couch Potato*, PCWorld, Oct. 1996.

*Hong Kong Comes First with Interactive TV*, SCI-TECH, Dec. 4, 1997.

*Interactive TV Overview TimeLine*, Interactive TV News.

*Interactive TV Wars Heat Up*, Industry Standard.

Needle. *Will the Net Kill Network TV?* PC World Online, Mar. 10, 1999.

Kane. *AOL-Tivo: You've Got Interactive TV*, ZDNN, Aug. 17, 1999.

Kay. *E-Mail in Your Kitchen*, PC World Online, 093/28/96.

Kenny. *TV Meets Internet*, PC World Online, Mar. 28, 1996.

Linderholm. *Avatar Debuts Home Theater PC, PC* World Online, Dec. 1, 1999.

Mendoza. *Order Pizza WhileYyou Watch*, ABCNews.com.

Moody. *WebTV: What the Big Deal?*, ABCNews.com.

Murdorf, et al. *Interactive Television—Is There Life After the Internet?*, Interactive TV News.

Needle. *PC, TV or Both?*, PC World Online.

*Interview with Steve Perlman*, CEO of Web-TV Networks, PC World Online.

Press. *Two Cultures, The Internet and Interactive TV*, Universite de Montreal.

Reuters. *Will TV Take Over Your PC?*, PC World Online.

Rohde. *Gates Touts Interactive TV*, InfoWorld, Oct. 14, 1999.

Ross. *Broadcasters Use TV Signals to Send Data*, PC World Oct. 1996.

Schlisserman. *Is Web TV a Lethal Weapon?*, PC World Online.

Stewart. *Interactive Television at Home: Television Meets the Internet*, Aug. 1998.

Swedlow. *Computer TV Shows: Ready for Prime Time?*, PC World Online.

Wilson. *U.S. West Revisits Interactive TV*, Interactive Week, Nov. 28, 1999.

"Catalyst Switched Port Analyzer (SPAN) Configuration Example", Document ID: 10570, Cisco Systems http://www.cisco.com/en/US/products/hw/swtiches/ps708/products_tech_note09186a008015c612.shtml Publication date: Sep. 1, 2006 (date retrieved using Internet Archive Wayback Machine), (http://web.archive.org/web/*/http://www. cisco.com/en/US/products/hw/switches/ps708/products_tech_note09186a00801560612.shtml.

* cited by examiner

RECORDING IN A DISTRIBUTED ENVIRONMENT

CROSS REFERENCE

This application is related to U.S. patent application Ser. No. 11/608,340, entitled "Systems and Methods for Recording," filed on the same day as this application, which is hereby incorporated by reference, in its entirety. This application is also related to U.S. patent application Ser. No. 11/608,358, entitled "Systems and Methods for Recording Data," filed on the same day as this application, which is hereby incorporated by reference, in its entirety.

TECHNICAL FIELD

This application is related to recording at least a portion of a communication. More specifically, this application is related to recording at least a portion of a communication in a communications network.

BACKGROUND

In many communications environments, recording of communication data is desired. More specifically, oftentimes, users and/or organizations desire to capture data related to communications associated with one or more communications devices and/or other endpoints. While recording from a single communications device may be useful, users and organizations with a plurality of communications devices may desire to record data associated with two or more of the communications devices. Additionally, users and organizations may desire to implement automatic recording of communication data, such that a user need not actively initiate recording of a communication. As these users and organizations may desire increased functionality in their recording services, passively recording from each subscriber line via separate recording devices may prove unduly costly and inefficient. Similarly, actively recording communications may prove difficult due to reliability issues associated with a recording device.

SUMMARY

Included are embodiments for recording data from a communication. A least one embodiment includes a system for recording data from a communication that includes a controller component and a gateway component coupled to a switching component. In at least one embodiment the gateway component configured to receive at least a portion of the control data, the gateway component further configured to receive media data associated with the with the communication.

Other systems, methods, features, and/or advantages of this disclosure will be or may become apparent to one with skill in the art upon examination of the following drawings and detailed description. It is intended that all such additional systems, methods, features, and advantages be included within this description and be within the scope of the present disclosure.

BRIEF DESCRIPTION

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

Figure 1:
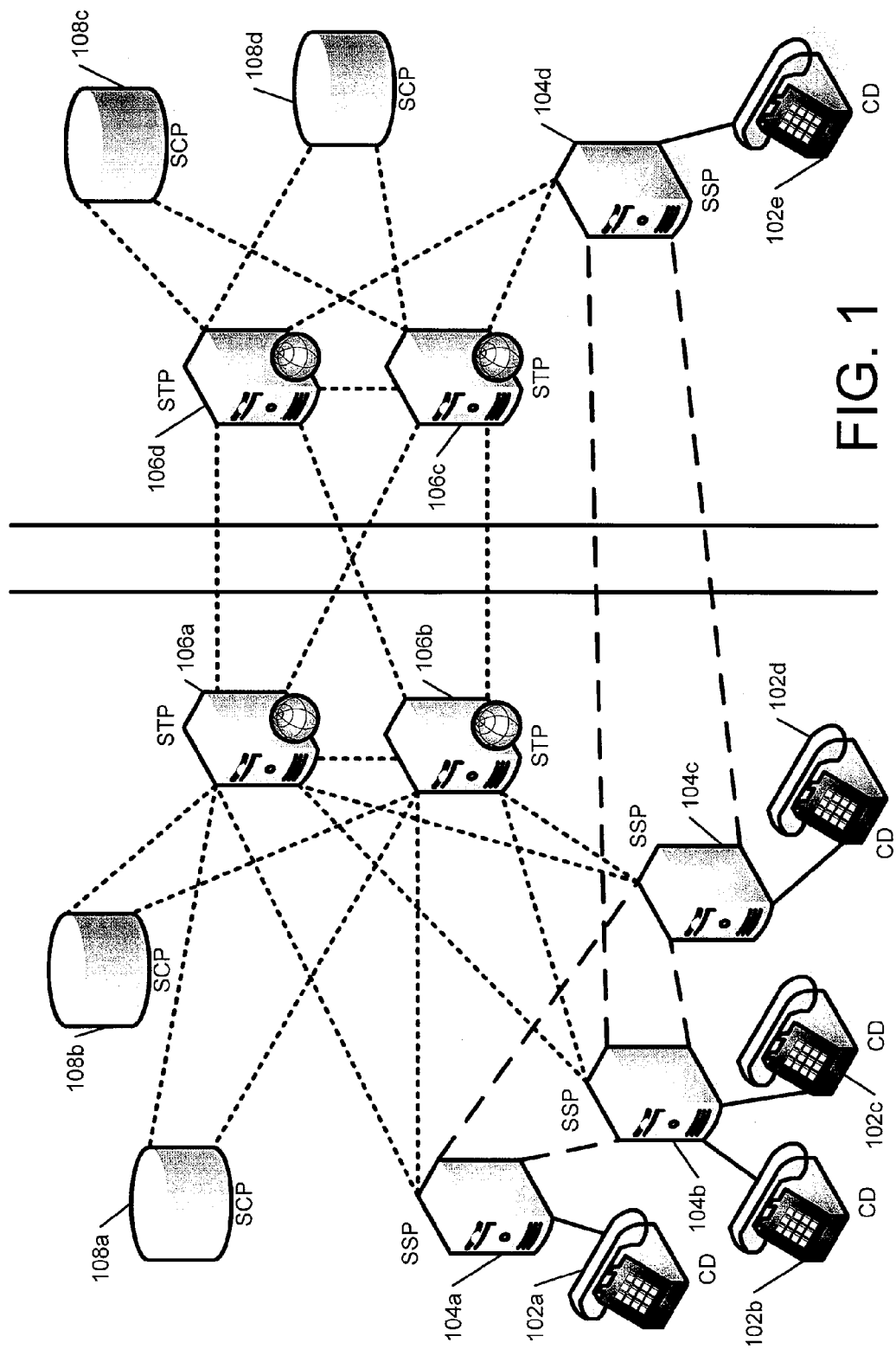
FIG. 1 is an exemplary embodiment of a communication network illustrating a plurality of components that may be utilized in facilitating a communication.

FIG. 1 is an exemplary embodiment of a communication network illustrating a plurality of components that may be utilized in facilitating a communication. As illustrated in the nonlimiting example of FIG. 1, communications devices 102a, 102b, 102c, 102d, and 102e may be configured to facilitate communications among two or more users.

Additionally, Service Switching Point (SSP) 104a is coupled to communications device 102a. SSP 104a may be configured to facilitate a communications path between communications device 102a and one or more other communications devices. SSP 104a may be configured to originate, terminate, and/or switch communications sessions (e.g., telephone calls, and/or other communications). While SSP 104 may be configured to facilitate communication of media data (e.g., voice, screen, and/or other substantive data associated with the communication), SSP 104 may be configured to facilitate communication of control data via a signaling protocol, such as a Signaling System 7 (SS7) protocol. Control data may be configured to provide non-substantive data related to the communication, such as provide media data instruction information.

Similarly, communications devices 102*b* and 102*c* are coupled (electrically, communicatively, and/or physically) to SSP 104*b*. Communications device 102*d* is coupled to SSP 104*c* and communications device 102*e* is coupled to SSP 104*d*. Additionally, SSP 104*a* is coupled SSP 104*b* and SSP 104*c*, as well as Signal Transfer Point (STP) 106*a* and STP 106*b*. SSP 104*b* and SSP 104*c* are also coupled to STP 106*a* and 106*b*. SSP 104*c* is coupled to SSP 104*d*. SSP 104*d* is coupled to STP 106*c* and 106*d*. Similarly, STP 106*a* and STP 106*b* are coupled to STP 106*d* and 106*d*.

One should note that SSP may include any of a plurality of different components, to provide the desired functionality. More specifically, as a nonlimiting example, at least one of the embodiments disclosed herein may substitute the SSP for any switching component, whether operating in a Time Division Multiplexing (TDM) environment and/or in an Internet Protocol (IP) environment.

STPs 106 may be configured as packet switches for control data associated with a communications session between users on communications devices 102. More specifically, STPs 106 may be configured to receive control data from SSP 104 and facilitate communication of the control data to a desired destination. As discussed above, STPs 106 may be configured to operate via the SS7 protocol and/or other protocols.

Additionally, STP 106*a* and STP 106*b* are also coupled to Signal Control Point (SCP) 108*a* and SCP 108*b*. Similarly, STP 106*c* and STP 106*d* are coupled to SCP 108*c* and 108*d*. In operation, SCPs 108 may be configured to store data that may be utilized for call processing. More specifically, SCPs 108 may be queried to determine how a communication is handled. As a nonlimiting example, one or more SCPs may be consulted to provide the translation of a toll free telephone number (and/or other address) to an actual phone number and facilitate billing of the owner of the toll free number for the communication.

In operation, the network of FIG. 1 may be configured to facilitate a communication among communications devices. As a nonlimiting example, if a user on communications device 102*a* may desire a communication with a user on communications device 102*e*. In such a scenario, a user may initiate the communication by dialing an address (e.g., telephone number and/or other address). The SSP 104*a* may receive data associated with communication device 102*a* and data associated with communications device 102*e*. SSP 104*a* may determine a desired path, such as a desired trunk to facilitate communication of media between users on communications devices 102*a* and 102*e*. Media data associated with the communication may be sent from SSP 104*a* to SSP 104*c* and then to SSP 104*d* for delivery to communications device 102*e*. Similarly, control data associated with the communication may be sent from SSP 104*a* to STP 106*b*. STP 106*b* may send the control data to STP 106*d*, which can send the control data to SSP 104*d*.

One should also note, that while SSPs 104 are illustrated as a single component, one should note that in at least one embodiment, SSP 104 represents a plurality of components associated with a call center. As discussed in more detail below, a call center may include a local SSP, a call control server, and/or other data. Additionally, while some embodiments may be configured form implementation in a Time Division Multiplexing (TDM) environment, other environments are also contemplated.

Figure 2:
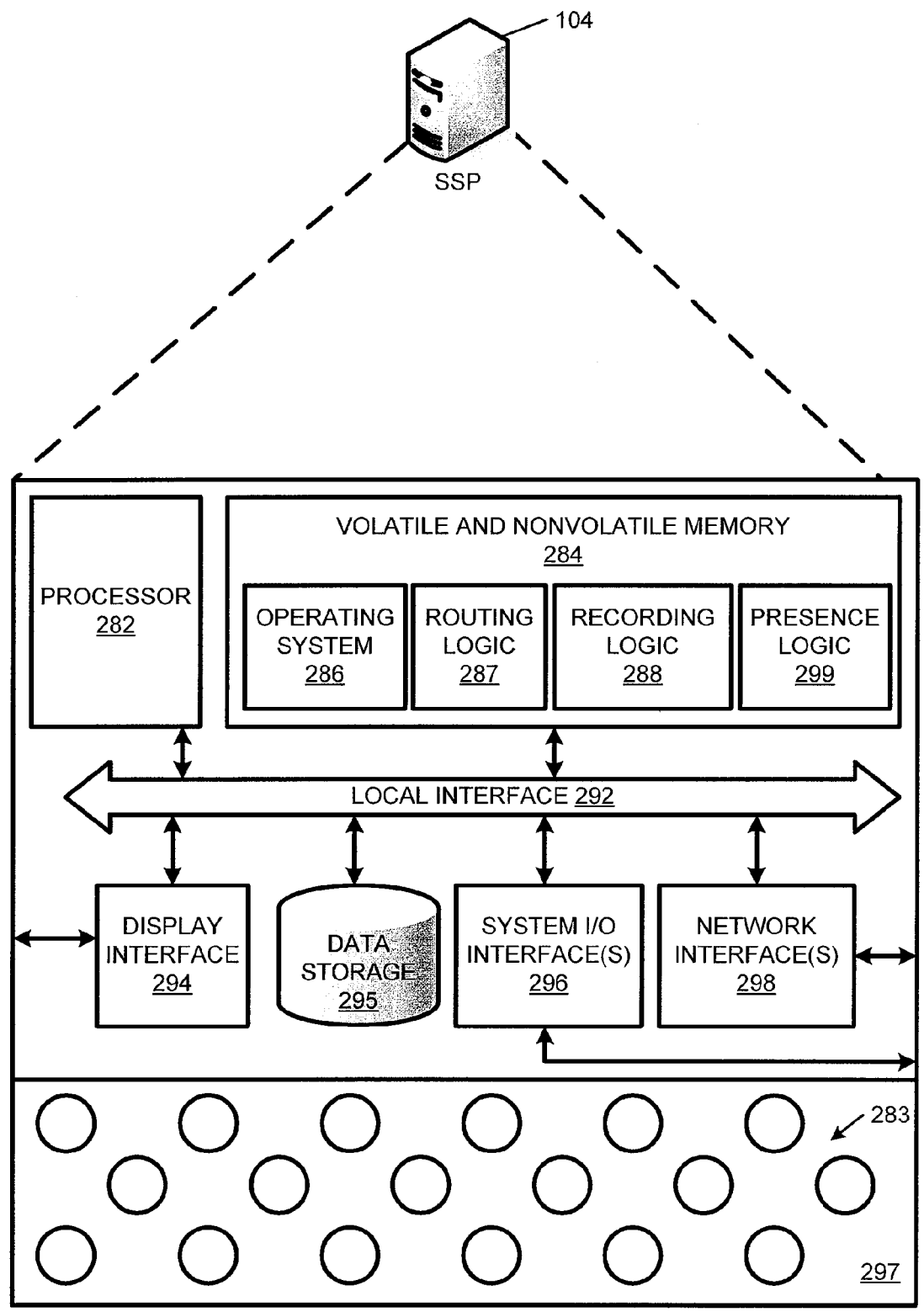
FIG. 2 is an exemplary embodiment of a Service Switching Point (SSP), similar to the SSPs from FIG. 1.

FIG. 2 is an exemplary embodiment of a Service Switching Point (SSP), similar to the SSPs from FIG. 1. Although a wire-line device is illustrated, this discussion can be applied to wireless devices, as well. Generally, in terms of hardware architecture, as shown in FIG. 2, SSP 104 includes a processor 282, volatile and nonvolatile memory 284, a display interface 294, data storage 295, one or more input and/or output (I/O) device interface(s) 296, and/or one or more network interface 298 that are communicatively coupled via a local interface 292. The local interface 292 can include, for example but not limited to, one or more buses or other wired or wireless connections. The local interface 292 may have additional elements, which are omitted for simplicity, such as controllers, buffers (caches), drivers, repeaters, and receivers to enable communications. Further, the local interface may include address, control, and/or data connections to enable appropriate communications among the aforementioned components. The processor 282 may be a device for executing software, particularly software stored in volatile and nonvolatile memory 284.

The processor 282 can be any custom made or commercially available processor, a central processing unit (CPU), an auxiliary processor among several processors associated with the SSP 104, a semiconductor based microprocessor (in the form of a microchip or chip set), a macroprocessor, or generally any device for executing software instructions.

The volatile and nonvolatile memory 284 can include any one or combination of volatile memory elements (e.g., random access memory (RAM, such as DRAM, SRAM, SDRAM, etc.)) and/or nonvolatile memory elements (e.g., ROM, hard drive, tape, CDROM, etc.). Moreover, the memory 284 may incorporate electronic, magnetic, optical, and/or other types of storage media. One should note that the volatile and nonvolatile memory 284 can have a distributed architecture (where various components are situated remote from one another), but can be accessed by the processor 282. Additionally volatile and nonvolatile memory 284 can include routing logic 287, recording logic 288, presence logic 299, and/or an operating system 286. The operating system 286 may be configured to control the execution of other computer programs and provides scheduling, input-output control, file and data management, memory management, and communication control and related services.

A system component and/or module embodied as software may also be construed as a source program, executable program (object code), script, or any other entity comprising a set of instructions to be performed. When constructed as a source program, the program is translated via a compiler, assembler, interpreter, or the like, which may or may not be included within the volatile and nonvolatile memory 284, so as to operate properly in connection with the operating system 286.

The Input/Output devices that may be coupled to system I/O Interface(s) 296 may include input devices, for example but not limited to, a keyboard, mouse, scanner, microphone, etc. Further, the Input/Output devices may also include output devices, for example but not limited to, a printer, display, speaker, etc. Finally, the Input/Output devices may further include devices that communicate both as inputs and outputs, for instance but not limited to, a modulator/demodulator (modem; for accessing another device, system, or network), a radio frequency (RF) or other transceiver, a telephonic interface, a media duplication system, a router, etc.

Additionally included are one or more network interfaces 298 for facilitating communication with one or more other devices. More specifically, network interface 298 may include any component configured to facilitate a connection with another device. While in some embodiments, among others, the SSP 104 can include a network interface 298 that includes a Personal Computer Memory Card International Association (PCMCIA) card (also abbreviated as "PC card") for receiving a wireless network card, however this is a nonlimiting example. Other configurations can include the communications hardware within the computing device, such that a wireless network card is unnecessary for communicating wirelessly. Similarly, some embodiments may include network interfaces 298 for communicating via a wired connection. Such interfaces may be configured with Universal Serial Bus (USB) interfaces, serial ports, and/or other interfaces.

Additionally included in the nonlimiting example of FIG. 2 is a switching component 297. The switching component 297 may be configured to facilitate communication among two or more communications devices 102. While one or more of the switch ports 283 may be configured as a receiving port, one or more of the switch ports 293 may be configured as a transmit port. Similarly, while the switching component 297 may be configured to allow an operator to determine the receiving and/or transmit ports that are utilized for a particular communication, SSP 104 may be configured with logic to determine which switch ports are utilized.

If SSP 104 includes a personal computer, workstation, or the like, the software in the volatile and nonvolatile memory 284 may further include a basic input output system (BIOS) (omitted for simplicity). The BIOS is a set of software routines that initialize and test hardware at startup, start the operating system 286, and support the transfer of data among the hardware devices. The BIOS is stored in ROM so that the BIOS can be executed when the SSP 104 is activated.

When SSP 104 is in operation, the processor 282 may be configured to execute software stored within the volatile and nonvolatile memory 284, to communicate data to and from the volatile and nonvolatile memory 284, and to generally control operations of the client device 106 pursuant to the software. Software in memory, in whole or in part, may be read by the processor 282, perhaps buffered within the processor 282, and then executed.

One should note that while the description with respect to FIG. 2 includes an SSP 104 as a single component, this is a nonlimiting example. More specifically, in at least one embodiment, SSP 104 can include a plurality of servers, personal computers, and/or other devices. Similarly, while routing logic 287, recording logic 288 and presence logic 299 are each illustrated in FIG. 2 as single software components, this is also a nonlimiting example. In at least one embodiment, presence logic 299 may include one or more components, embodied in software, hardware, and/or firmware. Similarly, routing logic and/or recording logic 288 may include one or more logical components. Additionally, while routing logic 287, presence logic 299, and recording logic 288 are depicted as residing on a single computing device, such as recorder controller 210 may include one or more devices, presence logic 299 may include one or more components residing on one or more different devices.

Similarly, while the discussion with regard to FIG. 2 refers to a SSP 104, similar elements may also be included in other network components discussed herein. More specifically, a recorder, communications device, recorder controller, call control server, SCP, STP and/or other network elements may include similar components and/or functionality. Additionally, while components illustrated in FIG. 2 are illustrated as being part of an SSP 104, this is also a nonlimiting example, as other components may include the logic and/or functionality described in FIG. 2.

Figure 3A:
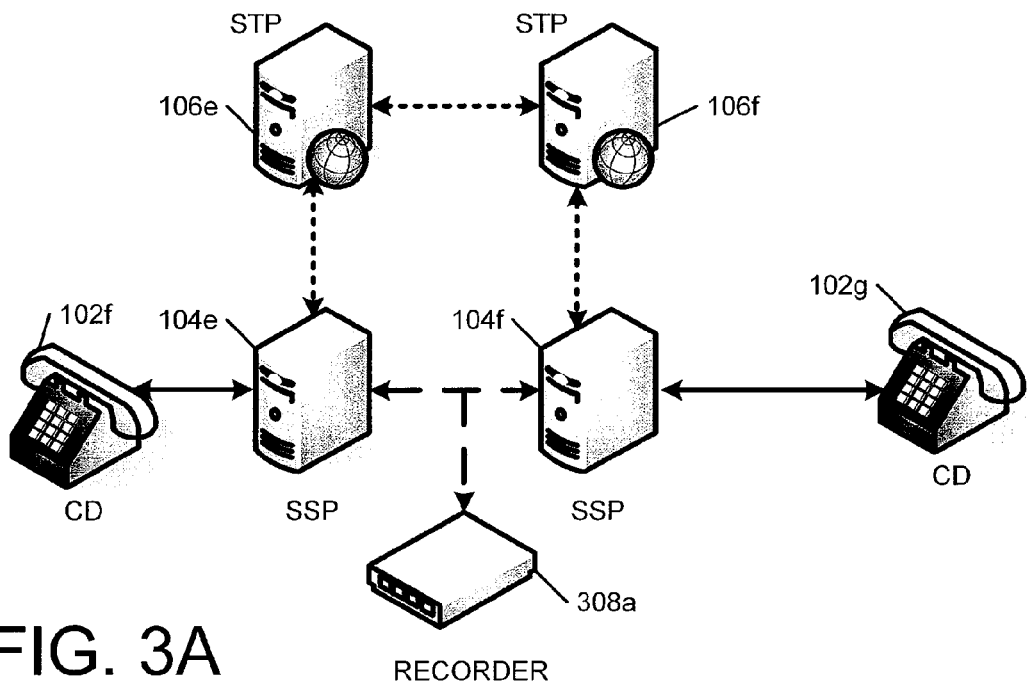
FIG. 3A is an exemplary embodiment of an implementation for passively recording a communication, such as between communications devices from FIG. 1.

FIG. 3A is an exemplary embodiment of an implementation for passively recording a communication, such as between communications devices from FIG. 1. As illustrated in the nonlimiting example of FIG. 3A, a user on communications device 102*f* may desire a communication session with a user on communications device 102*g*. As such, the user of communications device 102*f* may initiate a communication session to SSP 104*e*, via a subscriber line, as illustrated with a solid line. SSP 104*e* may be configured to receive control data, as well as media data associated with the communication. The media data may be sent to SSP 104*f*, as illustrated with a large dashed line.

Additionally, control data may be sent to STP 106*e* (which may be formatted in an SS7 protocol), as illustrated with a small dashed line. STP 106*e* may send the control data to STP 106*f*. Control data may then be sent to SSP 104*f*. SSP 104*f* can then facilitate the communication by sending the media data to communications device 102*g*.

As also illustrated in the nonlimiting example of FIG. 3A, a recorder (which may be embodied as a hardware component, a software component, and/or a hybrid hardware/software component) 308*a* may be passively coupled to the subscriber line between SSP 104*f* and communications device 102*g*. While such a configuration may provide recording functionality to communications device 102*g*, such a configuration may prove unable to adequately provide the desired recording functionality. More specifically, as the recorder 308*a* may be configured to passively record data from a point between SSP 104*e* and SSP 104*f*, the recorder in FIG. 3A may be unable to receive control data that would indicate control signals, such as signals that determine whether to record a particular communication, signals that determine when to start recording, when to end recording, and/or other control data.

Figure 3B:
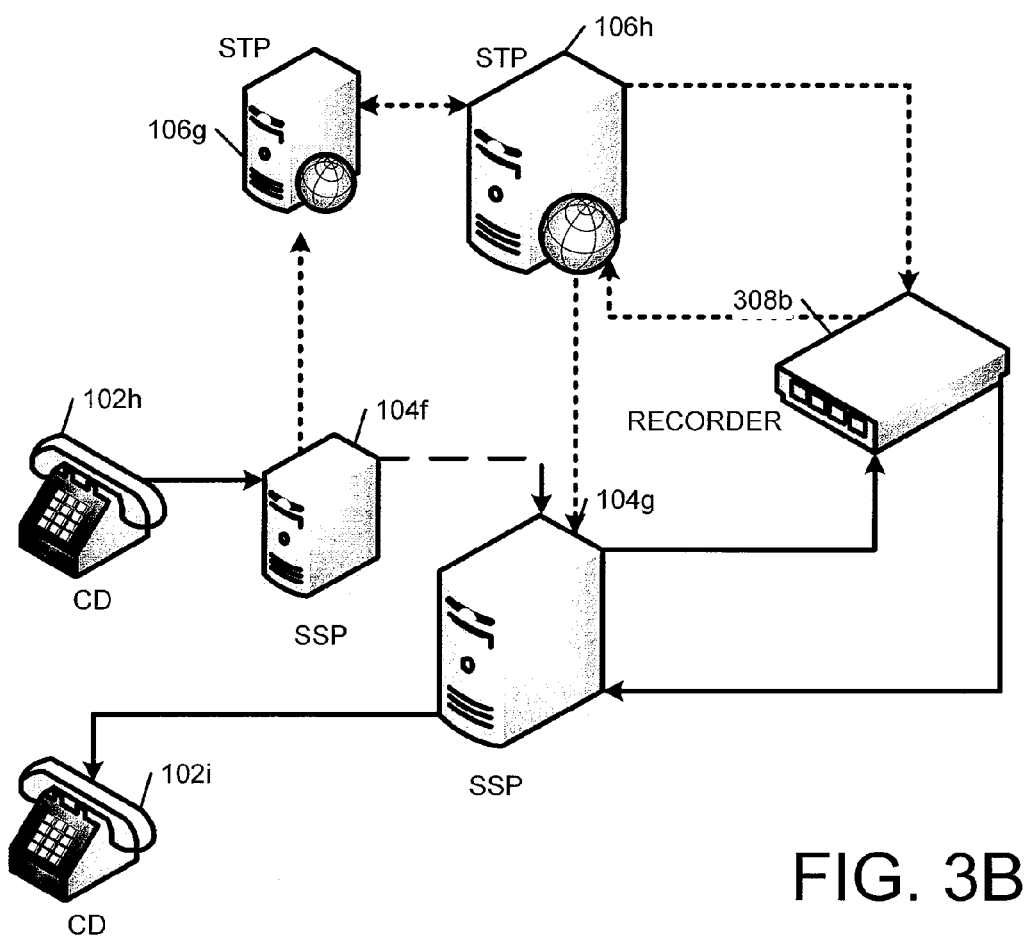
FIG. 3B is an exemplary embodiment of an implementation for actively recoding a communication, such as between communications devices from FIG. 1.

FIG. 3B is an exemplary embodiment of an implementation for actively recoding a communication, such as between communications devices from FIG. 1. As illustrated in the nonlimiting example of FIG. 3B, communications device 102*h* may initiate a communication with communications device 102*i*. In this nonlimiting example, SSP 104*f* receives data from communications device 102*h*. SSP 104*f* sends media data to SSP 104*g*. SSP 104*f* also sends control data to STP 106*g*.

Additionally, SSP 104*g* sends media data to recorder 308*b*, which captures the data and sends data to SSP 104*g*. Similarly, STP 106*g* sends control data to recorder 308*b*, which utilizes the control data to determine whether and/or when to begin and end recording. Recorder sends the control data back to STP 106*g*. SSP sends the media data to communications device 102*i*.

Similarly, some embodiments may be configured such that SSP 104*g* sends media data to recorder 308*b*, which is configured to interface directly with communications device 102*i*. Regardless, the embodiment of FIG. 3B illustrates a configuration where the recorder 308*b* actively records at least a portion of the communication. More specifically, as illustrated in this nonlimiting example, recorder 308*b* is a party to the communication and/or is a pathway for the media data to travel between the communications devices 102. As such, these embodiments may rely on the recorder to facilitate the communication (as opposed to simply recording the communication).

Figure 4:
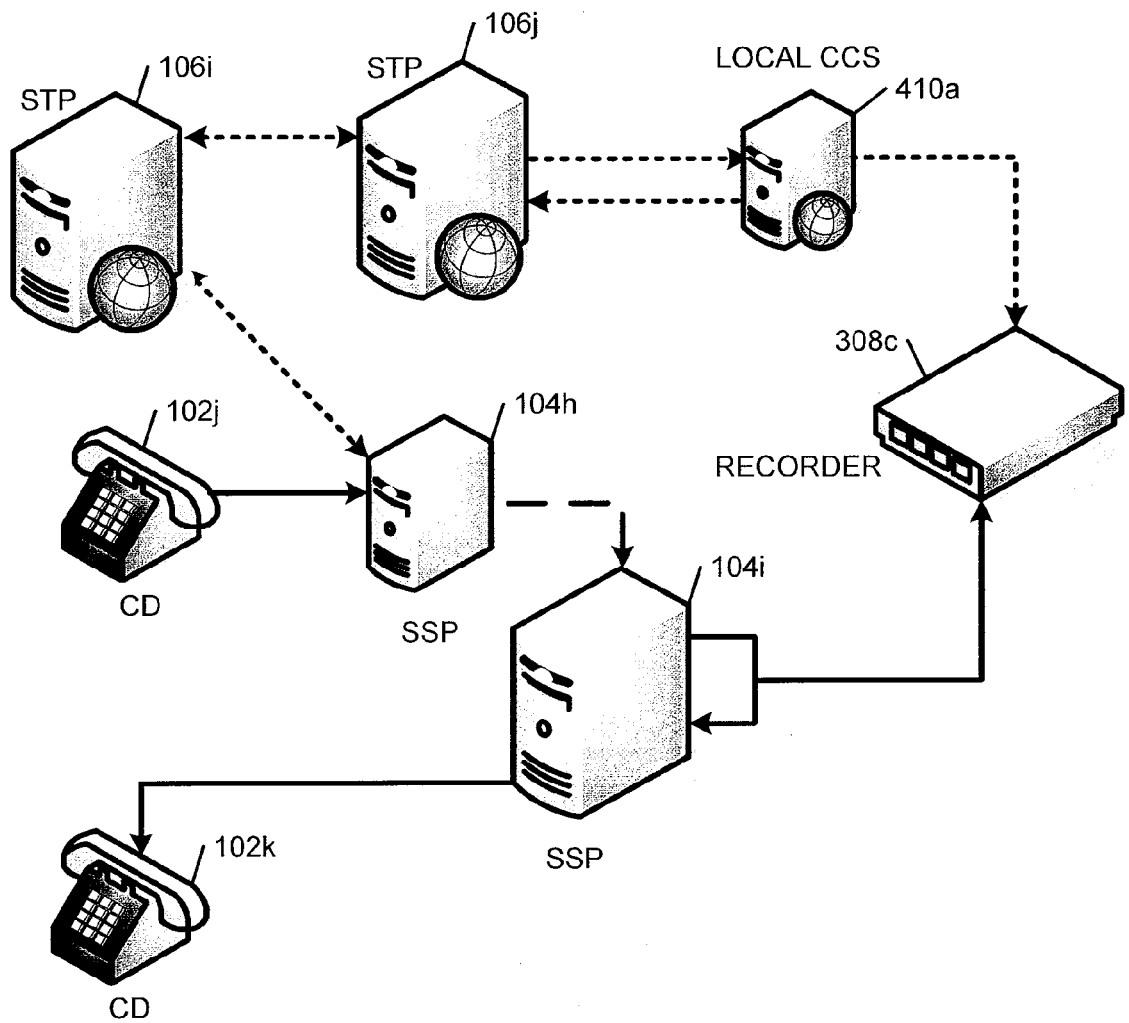
FIG. 4 is an exemplary embodiment of an implementation for passively recording a communication from an SSP, such as the SSP from FIG. 2.

FIG. 4 is an exemplary embodiment of an implementation for passively recording a communication from an SSP, such as the SSP from FIG. 2. As illustrated in the nonlimiting example of FIG. 4, communications device 102*j* may be configured to initiate a communication with communications device 102*k*. As such, data may be sent to SSP 104*h*, as discussed above. Similarly, STP 106*h* may be configured to receive control data associated with the present communication. At least a portion of the control data may be sent to a local Call Control Server (CCS), which may include logic for interfacing with the recorder 308*c*.

Additionally, media data may be sent from SSP 104*h* to SSP 104*i*. As illustrated, SSP 104*i* may be configured such that one or more of receiver switch ports 283 are coupled to one or more transmit switch ports 283. Thus media data is received from SSP 104*h* via a first receive switch port 283. This data is output via a first transmit switch port 283. The first transmit switch port 283 is coupled to a second receive switch 283, such that the media data is sent along this path. The media data is then output to communications device 102*k* via a second transmit switch port 283.

In the configuration of FIG. 4, the recorder 308*c* may be passively coupled to the line between the first transmit switch port 283 and the second receive switch port 283. More specifically, as illustrated in this nonlimiting example, recorder 308 is not a party to the communication and/or does not facilitate the communication. As recorder 308*c* is passively coupled to the link between the transmit switch port 283 and the receive switch port 283, reliability of the recorder is not an issue with regard to quality of the communication. Additionally, the recorder 308*c* may receive control data via local CCS 410*a*. Such a configuration provides the desired control data to facilitate the recording, while maintaining a passive recording configuration with regard to the media data.

Additionally, one should note that, while a single recorder 308*c* is illustrated in FIG. 4, some embodiments may be configured such that SSP 104*i* is coupled to a plurality of recorders and/or a recorder bank. In such a configuration, SSP 104*i* (and/or other components) may be configured with logic to determine a desired recording for the present communication. Additionally, some embodiments may be coupled to a load balancer and/or link protector to facilitate routing of the media data to a desired recorder, according to current network conditions.

Figure 5:
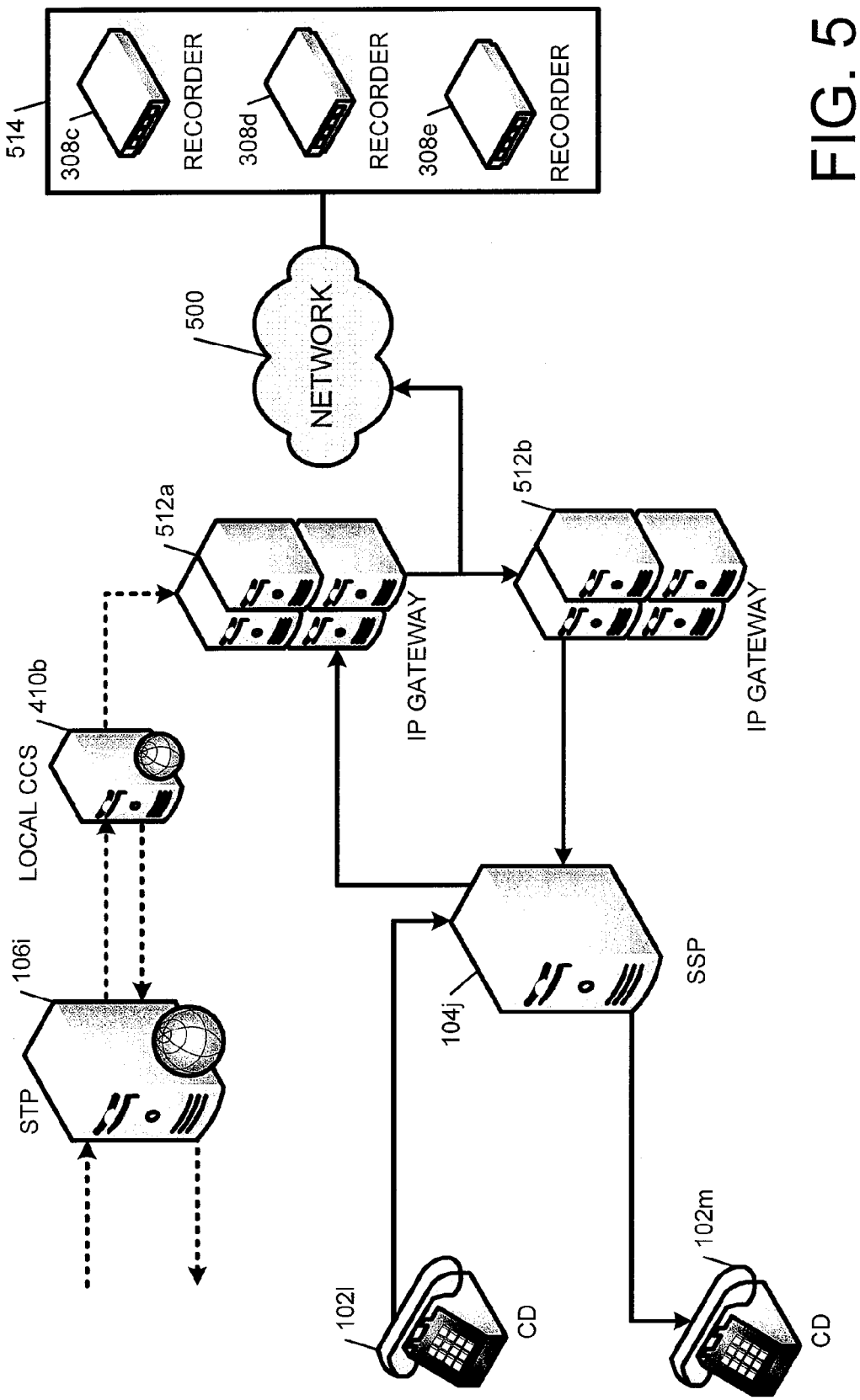
FIG. 5 is an exemplary embodiment of an implementation for passively recording a communication over a network, similar to the embodiment from FIG. 4.

FIG. 5 is an exemplary embodiment of an implementation for passively recording a communication over a network, similar to the embodiment from FIG. 4. As illustrated in the nonlimiting example of FIG. 5, a communications device 102*l* may be configured to initiate a communications with communications device 102*m*. As such, data may be sent to an SSP 104*j*. Similarly, control data may be sent to an STP 106*l*, which sends at least a portion of the control data to a local CCS 410*b*.

Similar to the configuration from FIG. 4, an IP gateway 512*a* may be coupled to an SSP 104*j* for receiving media data and/or control data. The IP gateway 512*a* may also be coupled to an IP gateway 512*b*. Additionally, a network 500 may be passively coupled to a line between the IP gateway 512*a* and the IP gateway 512*b*. The network 500, which may include the Internet, a Local Area Network (LAN), a Wide Area Network (WAN), and/or other network, may be configured to send data to recorder bank 514 for recording. The recorder bank 514 may include one or more recorders 308*c*, 308*d*, and 308*e*. Additionally, a recorder controller, link protector, and/or load balancer (not shown) may be coupled to the recorder bank 514 to facilitate efficient recording.

Figure 6:
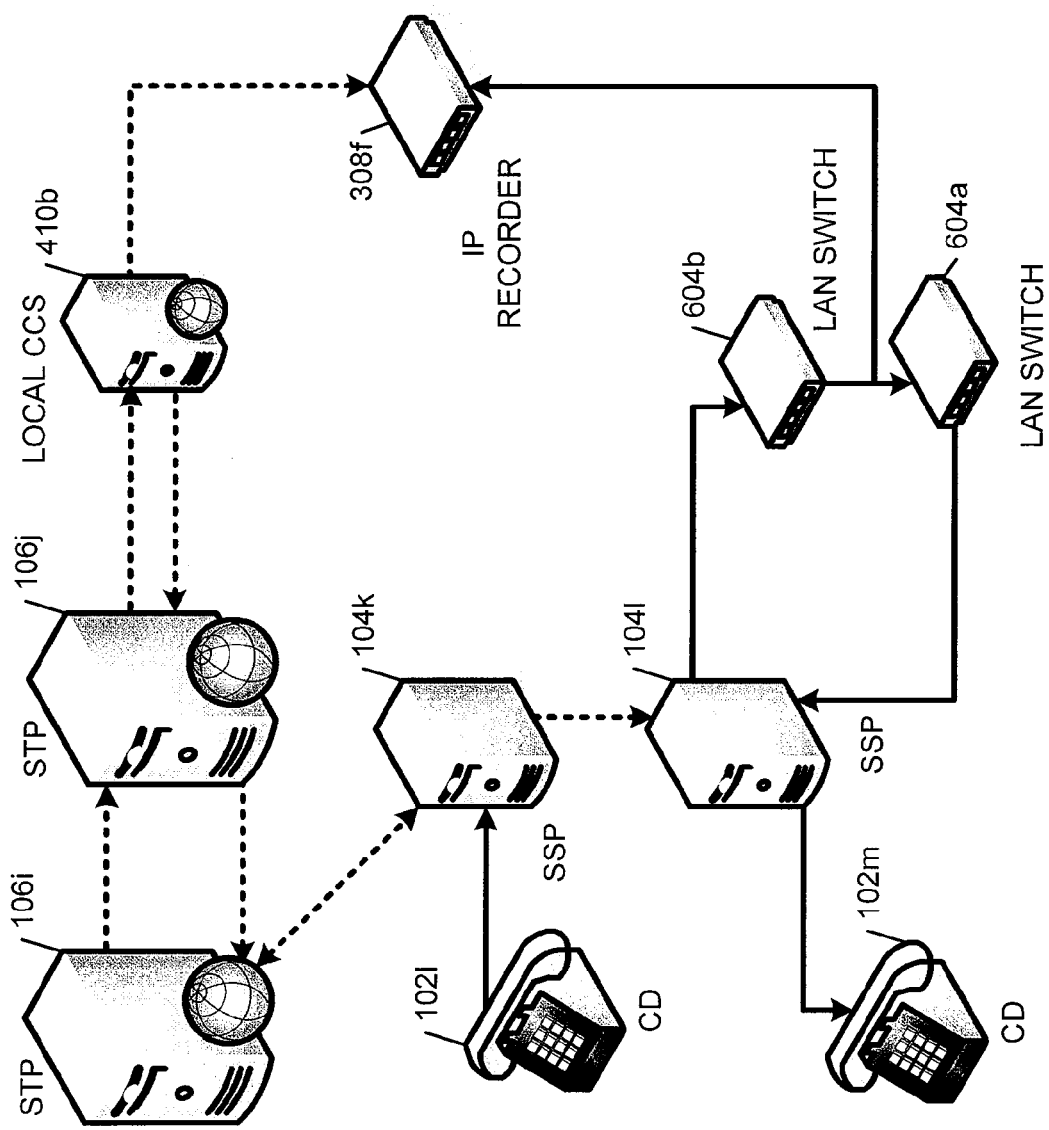
FIG. 6 is a diagram illustrating an exemplary embodiment of passively tapping a communications line in an IP environment, similar to the diagram from FIG. 5.

FIG. 6 is a diagram illustrating an exemplary embodiment of passively tapping a communications line in an IP environment, similar to the diagram from FIG. 5. As illustrated in the nonlimiting example of FIG. 6, control data may be received at an STP 106*i*. The STP 106*i* can send at least a portion of the control data to an STP 106*j*. The STP 106*j* can send data to and receive data from local CCS 410*b*. At least a portion of the control data can be sent to an IP recorder 308*f*. The STP 106*i* may also send data to and receive data from an SSP 104*k*.

Additionally, media data may be sent from a communications device 102*l* to an SSP 104*k*. The SSP 104*k* may send at least a portion of the media data to an SSP 104*l*. The SSP 104*l* may send data to a LAN switch 604*a*, which may send at least a portion of the media data to a LAN switch 604*b*. The LAN switch 604*b* can send at least a portion of the media data back to the SSP 104*j*. Additionally, the IP recorder 308*f* may passively connect with a communications line between the LAN switch 604*a* and the LAN switch 604*b*. From this passive connection, the IP recorder 308*f* may receive media data for recording.

Figure 7A:
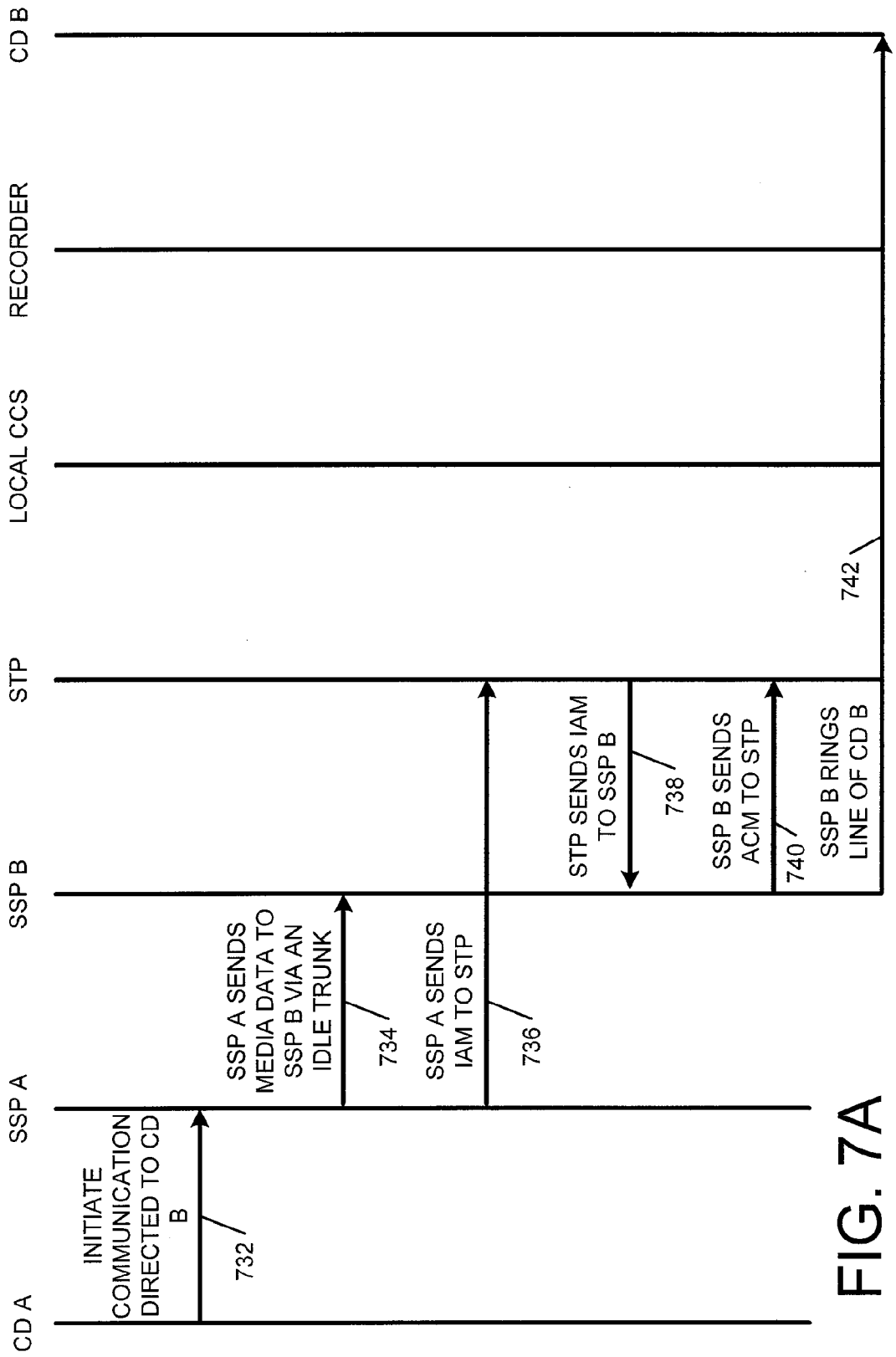
FIG. 7A is a sequence diagram illustrating an exemplary embodiment of actions that may be taken in recording a communication, similar to the implementation from FIG. 3A.

FIG. 7A is a sequence diagram illustrating an exemplary embodiment of actions that may be taken in recording a communication, similar to the implementation from FIG. 3A. As illustrated in the nonlimiting example of FIG. 7A, communications device A 102 can initiate a communication directed to communications device B 102 (Arrow 732). As discussed above, initiation of the communication may include sending data associated with the communications device A 102, as well as data related to the communications device B 102. SSP A 104 may receive this data and send media data to SSP B 104 (Arrow 734). Additionally, SSP A 104 sends an Initiating Address Message (IAM) to STP 106 (Arrow 736). STP 106 can send the IAM to SSP B 104 (Arrow 738). SSP B 104 can then send an Address Complete Message (ACM) to STP 106 (Arrow 740). SSP B 104 rings the line of communications device B 102 (Arrow 742).

Figure 7B:
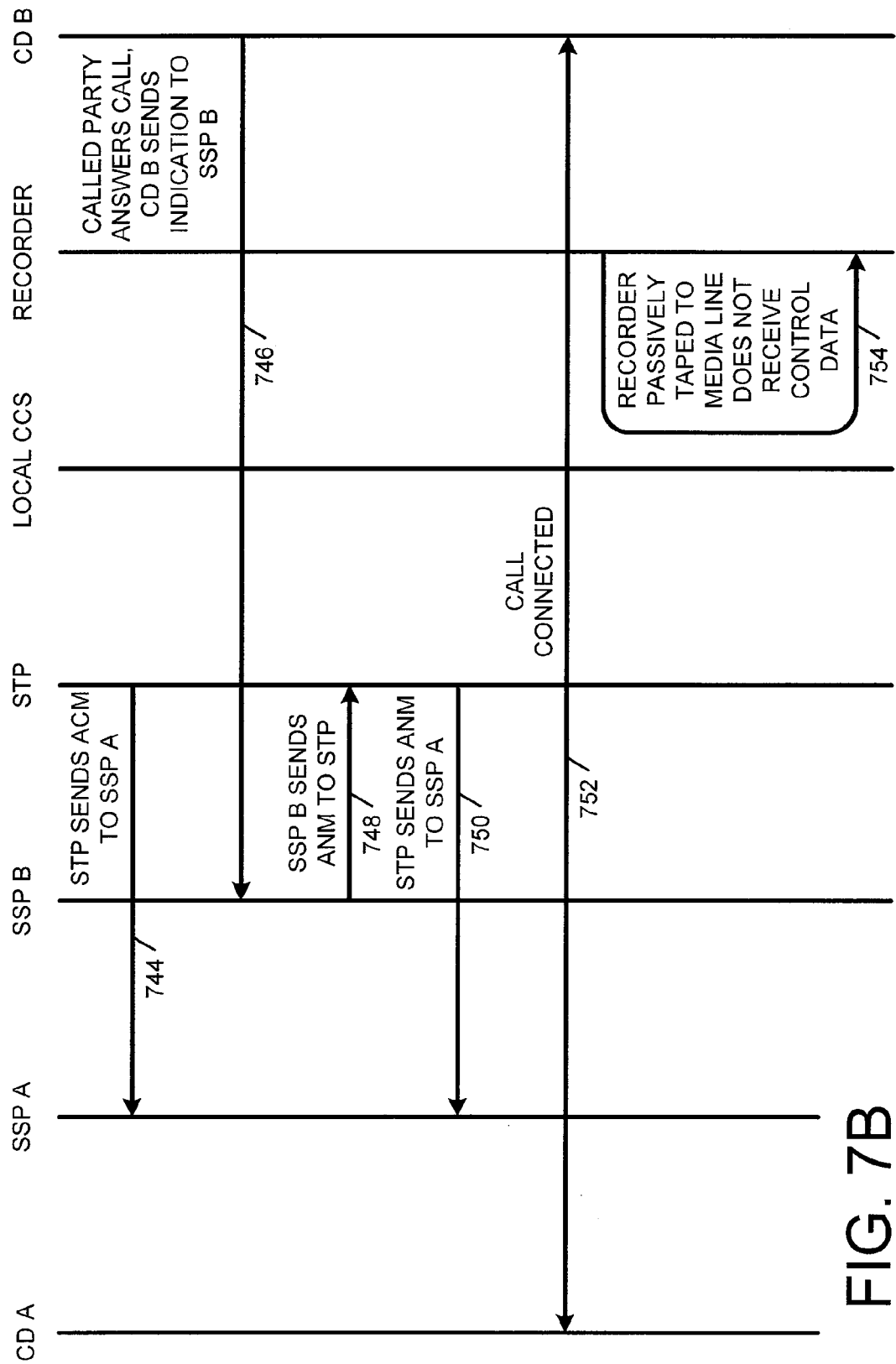
FIG. 7B is a continuation of the exemplary embodiment FIG. 7A.

FIG. 7B is a continuation of the sequence diagram from FIG. 7A. As illustrated, STP 106 sends the ACM to SSP A 104 (Arrow 744). The called party can answer the call and communications device B 102 sends indication that the call was answered to SSP B 104 (Arrow 746). Upon a user answering the call, SSP B 104 can send an Answer Message (ANM) to STP 106 (Arrow 748). STP 106 can then send the ANM to SSP A 104 (Arrow 750). At this point, the communications session between communications device A 102 and communications device B 102 is established (Arrow 752). As illustrated in the nonlimiting example of FIG. 3A, because the recorder 308*a* is passively recording the communication without access to control data, recording functionality may be limited (Arrow 754).

Figure 8A:
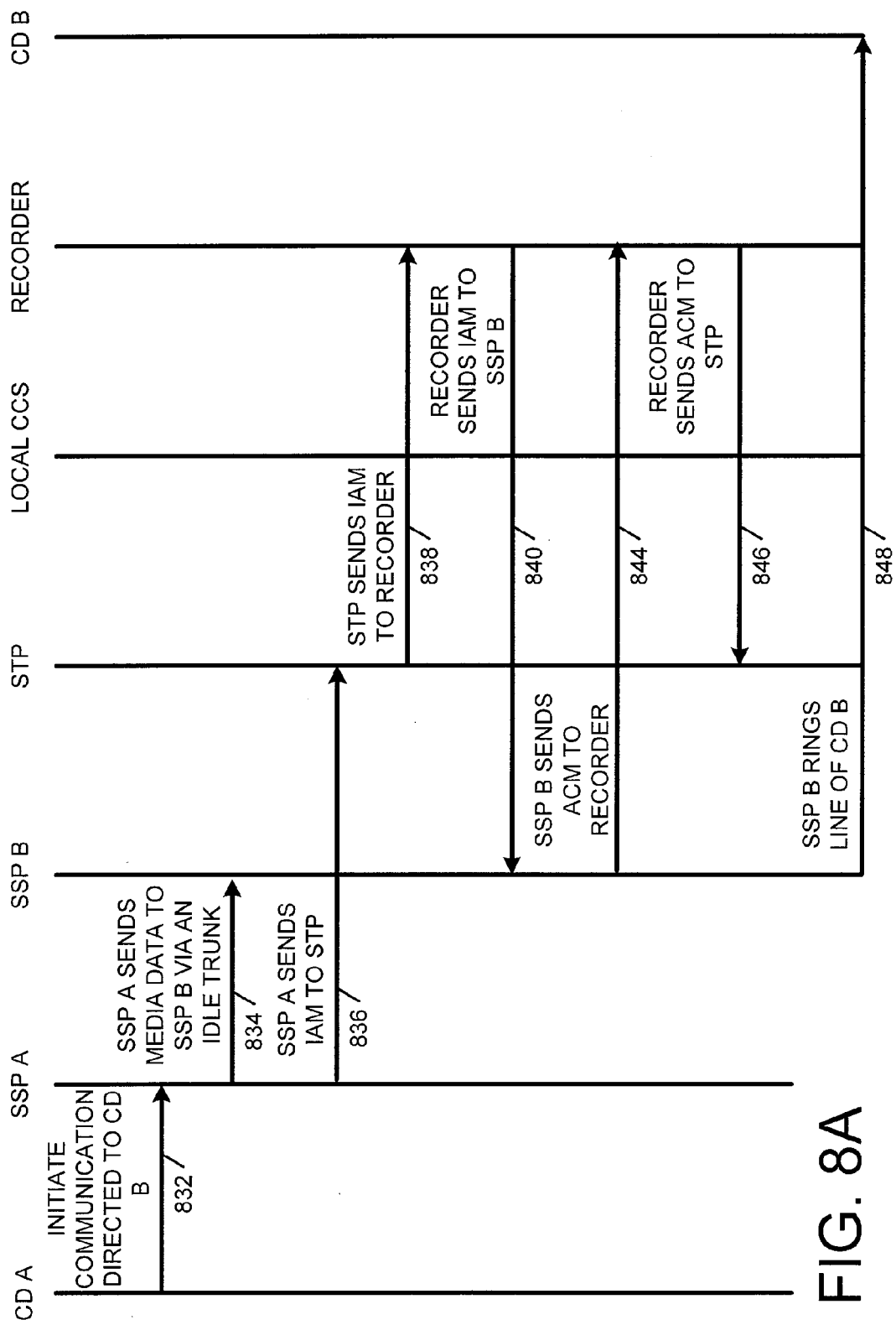
FIG. 8A is a sequence diagram illustrating an exemplary embodiment of actions that may be taken in recording a communication, similar to the sequence diagram from FIG. 7A.

FIG. 8A is a sequence diagram illustrating an exemplary embodiment of actions that may be taken in recording a communication, similar to the sequence diagram from FIG. 6A. As illustrated in the nonlimiting example of FIG. 8A, a communications device A 102 may initiate a communication directed to communications device B 102 (Arrow 832). The SSP A 104 can send media data to the SSP B 104 via an idle trunk (Arrow 834). The SSP A 104 can then send an IAM to the STP 106 (Arrow 836). STP 106 can then send the IAM to recorder 308*b* (Arrow 838). The recorder 308*b* can then send the IAM to the SSP B 102 (Arrow 840). SSP B then sends an ACM to the recorder 308*b* (Arrow 844). The recorder 308*b* can then send the ACM to the STP 106 (Arrow 846). The SSP B 104 can then ring the line of communications device B 102 (Arrow 848).

Figure 8B:
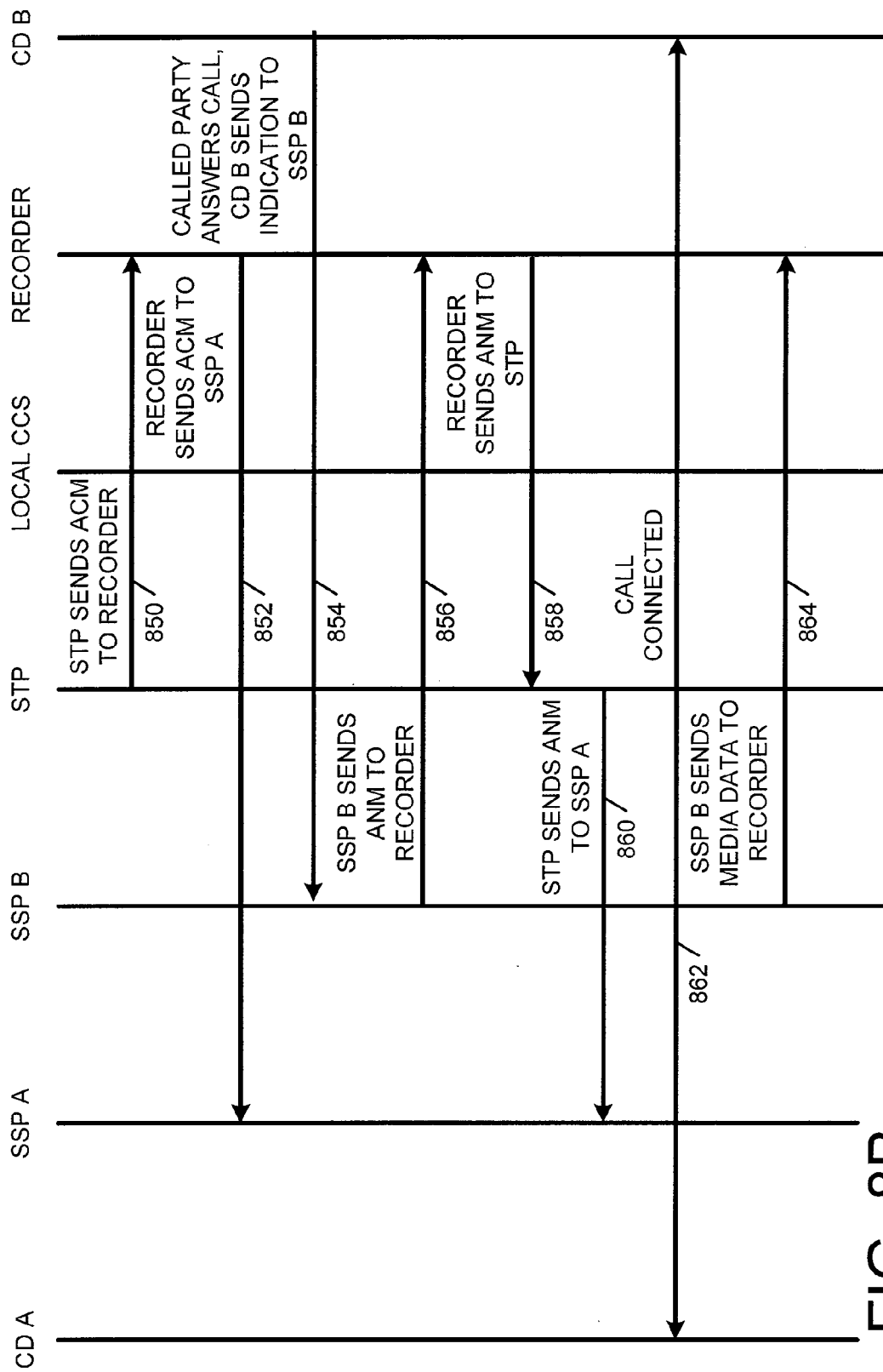
FIG. 8B is a continuation of the exemplary embodiment from FIG. 8A.

FIG. 8B is a continuation of the sequence diagram from FIG. 8A. As illustrated, the STP can then send the ACM to the recorder 308*b* (Arrow 850). The recorder 308*b* can then send the ACM to the SSP A 104 (Arrow 852). Additionally, the called party can answer the call and the communications device B 102 can send an indication to the SSP A 104 (Arrow 854). The SSP B 104 then sends an ANM to the recorder 308b. The recorder 308b can then send the ANM to the STP 106 (Arrow 858). The STP 106 can send the ANM to the SSP A 104 (Arrow 860). At this point, the communications session may be established (Arrow 862). The SSP B 104 sends the media data to the recorder 308b (Arrow 864).

As discussed with reference to FIG. 3B, the embodiment of FIGS. 8A and 8B may facilitate recording via an active connection of the recorder with the communication. As such a configuration may allow the receipt of control data associated with the communication, such a configuration may rely on the recorder to facilitate the communication. As such, if the recorder malfunctions, the integrity of the communication may suffer.

Figure 9A:
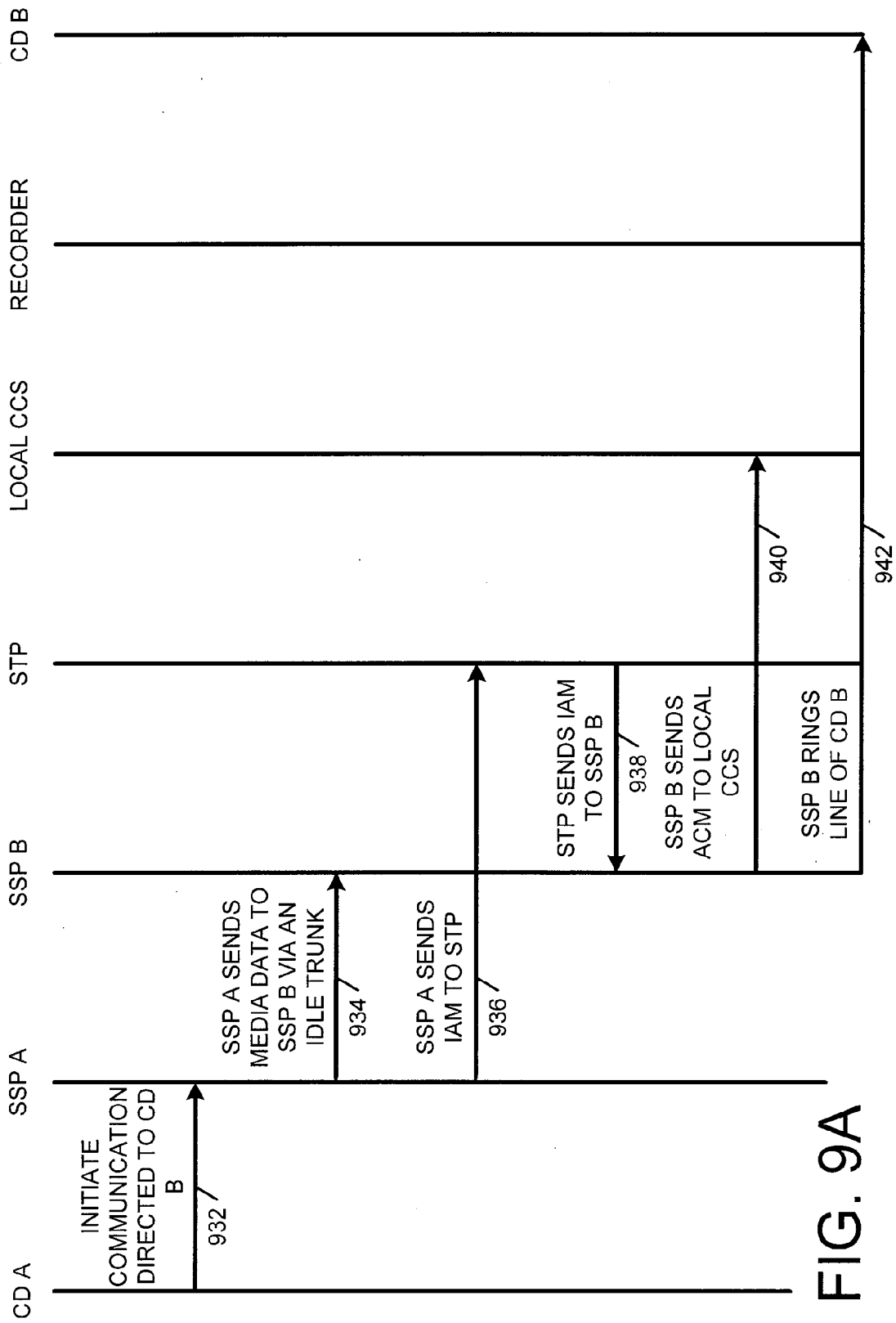
FIG. 9A is a sequence diagram illustrating an exemplary embodiment of actions that may be taken in recording a communication, similar to the sequence diagram from FIG. 8A.

FIG. 9A is a sequence diagram illustrating an exemplary embodiment of actions that may be taken in recording a communication, similar to the sequence diagram from FIG. 7A. As illustrated in the nonlimiting example of FIG. 9A, a communications device A 102 may be configured to initiate a communication directed to a communications device B 102 (Arrow 932). An SSP A 104 can send media data to an SSP B 104 via an idle trunk (Arrow 934). The SSP A 104 can also send an IAM to the STP 106 (Arrow 936). The STP 106 can then send the IAM to the SSP B 104 (Arrow 938). The SSP B 104 then sends an ACM to a local CCS 410a (Arrow 940). The SSP B 104 can then ring the line of communications device B 102.

Figure 9B:
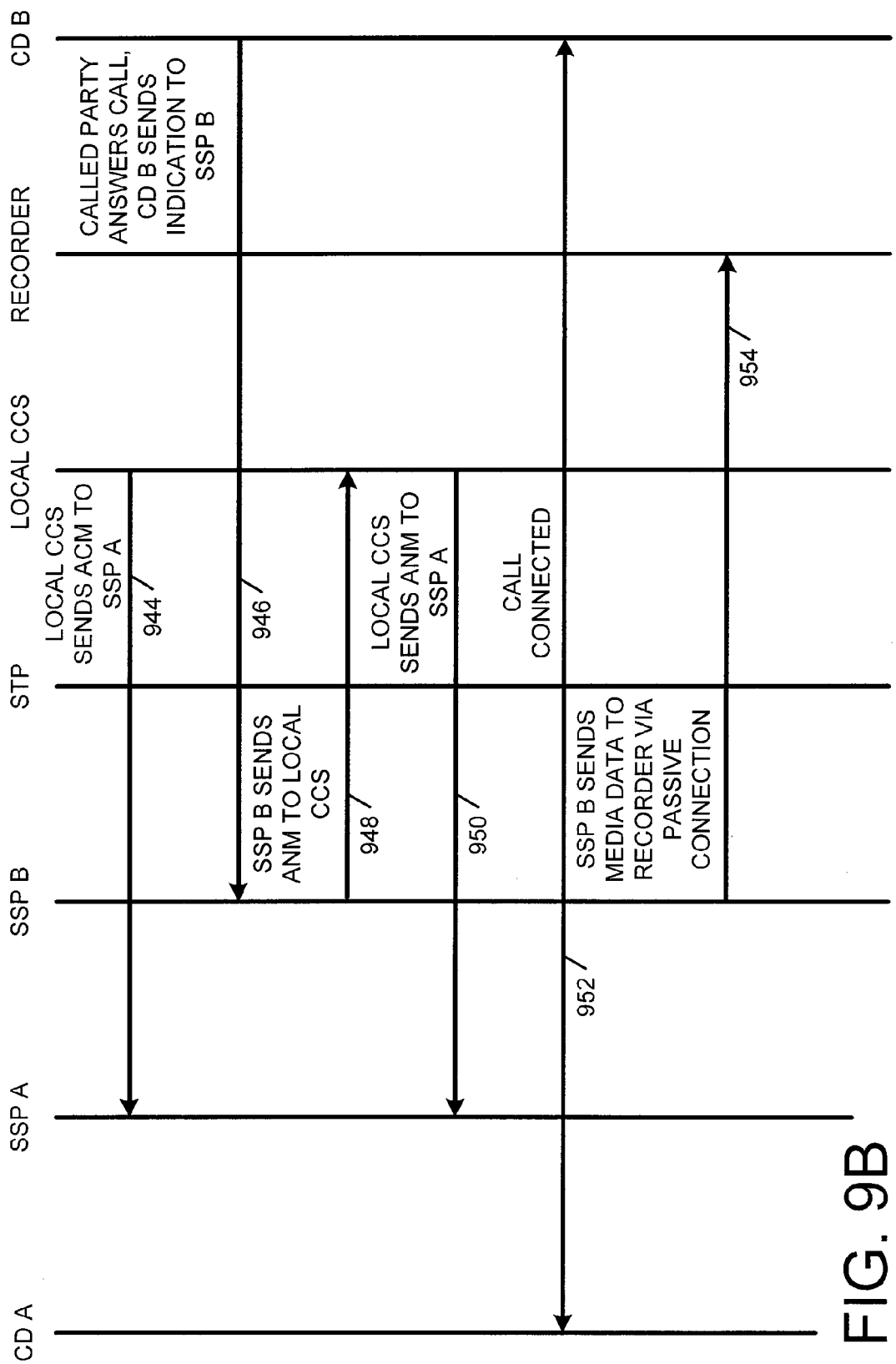
FIG. 9B is a continuation of the exemplary embodiment from FIG. 9A.

FIG. 9B is a continuation of the sequence diagram from FIG. 9A. As illustrated, the local CCS 410a may then send the ACM (or at least a portion of the ACM) to the SSP A 104 (Arrow 944). The called party can then answer the call and the communications device B 102 can send an indication to the SSP B 104 (Arrow 946). The SSP B 104 sends an ANM to the local CCS 410a (Arrow 948). The local CCS 410a can then send the ANM to the SSP A 104 (Arrow 950). At this point the communications session may be established (Arrow 952). The SSP B 104 may then send media data to recorder 308c via a passive connection (Arrow 954). As discussed above, with regard to FIG. 4, by utilizing a connection between a transmit switch port and a receive switch port on the SSP 104, the recorder 308c can passively record the communication while receiving signal data.

Figure 10A:
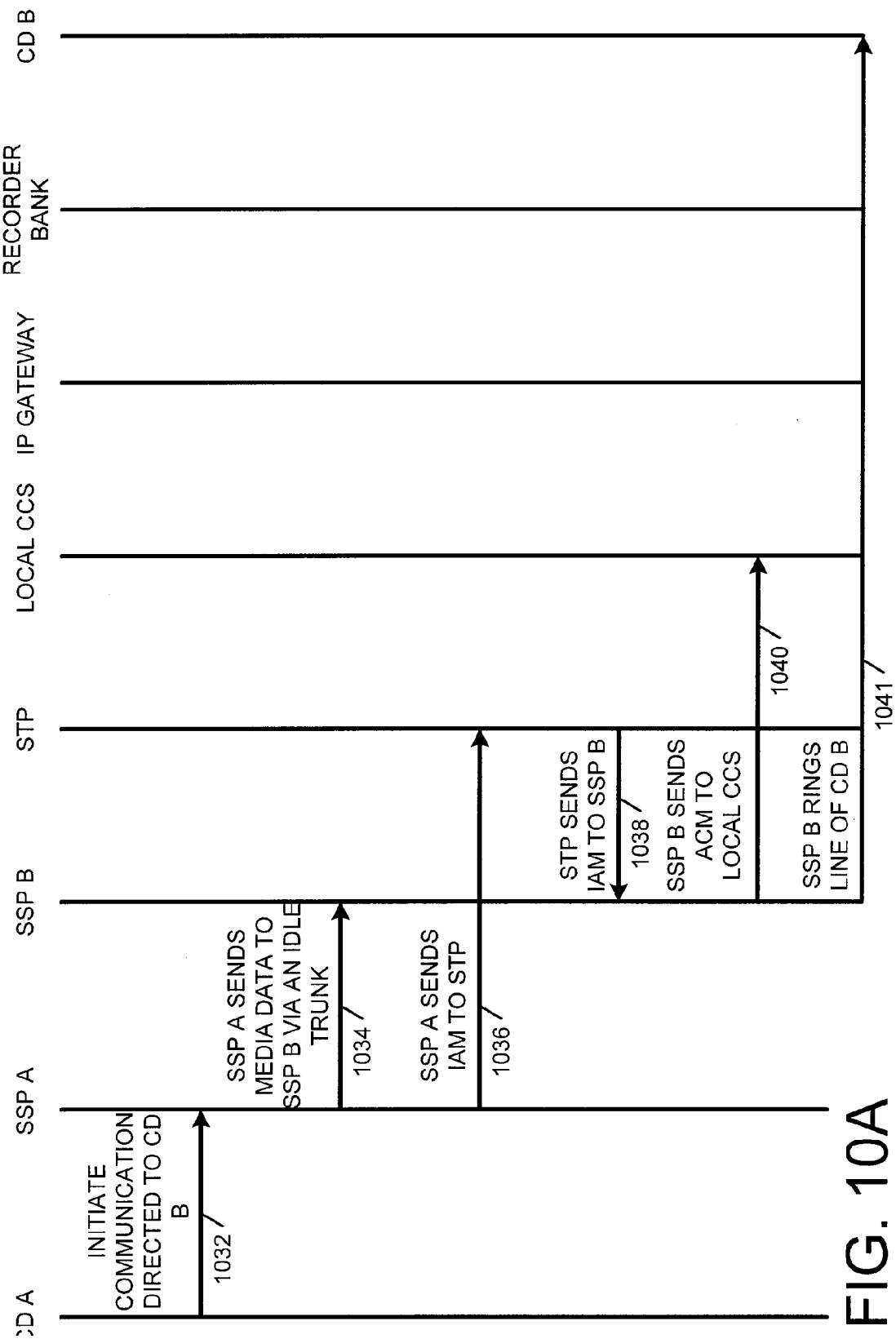
FIG. 10A is a sequence diagram illustrating an exemplary embodiment of actions that may be taken in recording a communication, similar to the sequence diagram from FIG. 9A.

FIG. 10A is a sequence diagram illustrating an exemplary embodiment of actions that may be taken in recording a communication, similar to the sequence diagram from FIG. 8A. As illustrated in the nonlimiting example of FIG. 10A, a communications device A 102 can initiate a communication directed to communications device B 102 (Arrow 1032). An SSP A 104 can send media data to an SSP B 104 via an idle trunk (Arrow 1034). The SSP A 104 can then send an IAM to an STP 106 (Arrow 1036). The STP 106 can send the IAM to SSP B 104 (Arrow 1038). The SSP B 104 can send an ACM to the local CCS 410b (Arrow 1040). The SSP B 104 can then ring the line of communications device B 102 (Arrow 1041).

Figure 10B:
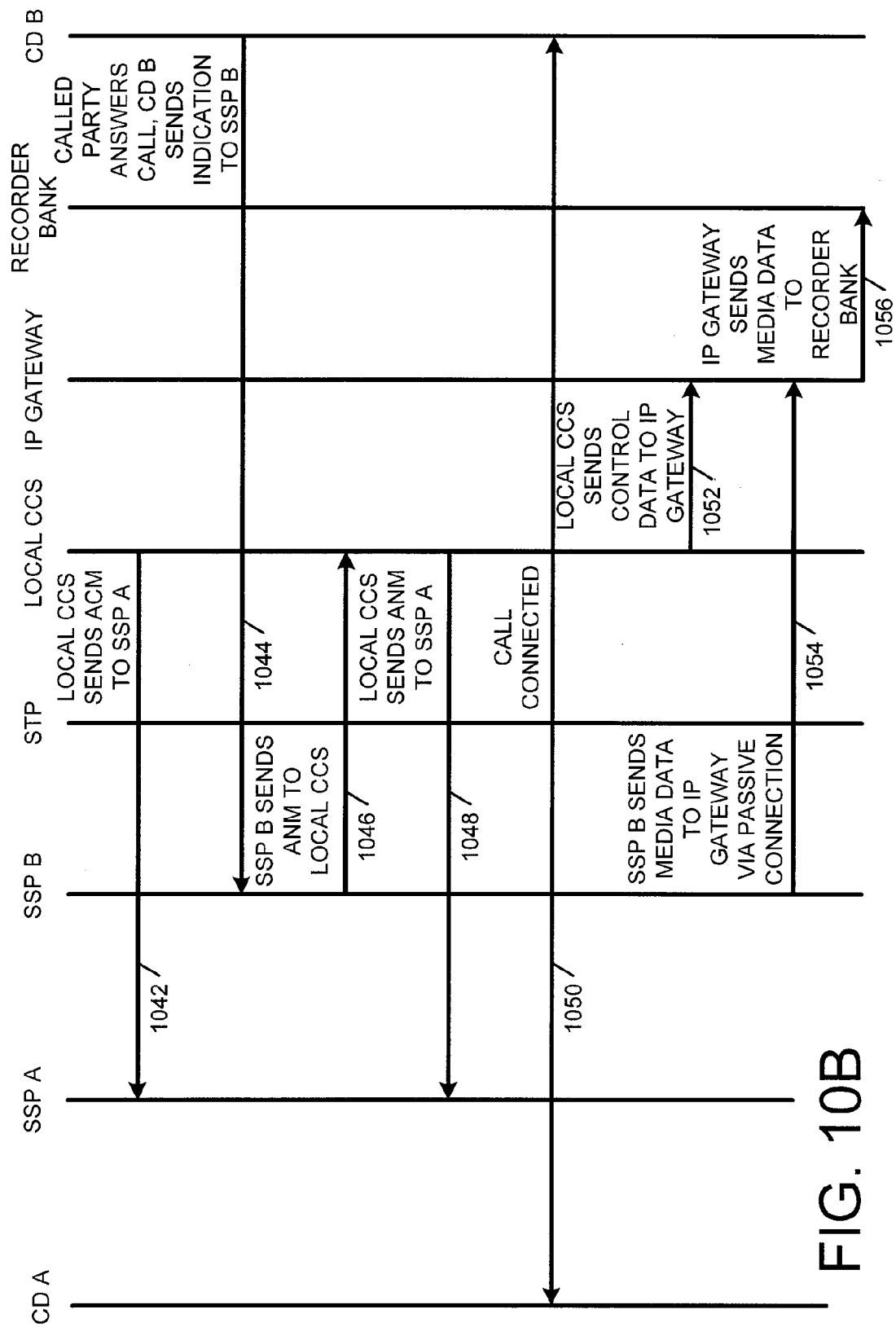
FIG. 10B is a continuation of the exemplary embodiment from FIG. 10A.

FIG. 10B is a continuation of the sequence diagram from FIG. 8A. As illustrated, the local CCS 410b can send the ACM to the SSP A 104 (Arrow 1042). The called party can then answer the call and communications device B 102 can send an indication to the SSP B 104 (Arrow 1044). The SSP B 104 can send an ANM to the local CCS 410b (Arrow 1046). The local CCS 410b can send the ANM to the SSP A 104 (Arrow 1048). At this point the call may be connected (Arrow 1050). The local CCS can then send control data to an IP gateway 512 (Arrow 1052). Additionally, the SSP B 104 can send media data to the IP gateway 512 via a passive connection (Arrow 1054). The IP gateway can then send the media data to a recorder and/or recorder bank 514 (Arrow 1056).

As discussed with respect to FIG. 5, embodiments disclosed herein may facilitate passive recording with a distributed recorder configuration. By utilizing a distributed recorder configuration, recorders efficiency may be maximized by utilizing routing logic that distributes recording in a substantially equal manner. Additionally, depending on the particular embodiment, a controller component (which may include an SCP) may include an SSP node, an Automatic Call Distributor (ACD) Private Branch Exchange (PBX), and/or other components.

Additionally, a call center may include, but is not limited to, outsourced contact centers, outsourced customer relationship management, customer relationship management, voice of the customer, customer interaction, contact center, multimedia contact center, remote office, distributed enterprise, work-at-home agents, remote agents, branch office, back office, performance optimization, workforce optimization, hosted contact centers, and speech analytics, for example.

Additionally included in this disclosure are embodiments of integrated workforce optimization platforms, as discussed in U.S. application Ser. No. 11/359,356, filed on Feb. 22, 2006, entitled "Systems and Methods for Workforce Optimization," which is hereby incorporated by reference in its entirety. At least one embodiment of an integrated workforce optimization platform integrates: (1) Quality Monitoring/Call Recording—voice of the customer; the complete customer experience across multimedia touch points; (2) Workforce Management—strategic forecasting and scheduling that drives efficiency and adherence, aids in planning, and helps facilitate optimum staffing and service levels; (3) Performance Management—key performance indicators (KPIs) and scorecards that analyze and help identify synergies, opportunities and improvement areas; (4) e-Learning—training, new information and protocol disseminated to staff, leveraging best practice customer interactions and delivering learning to support development; and/or (5) Analytics—deliver insights from customer interactions to drive business performance. By way of example, the integrated workforce optimization process and system can include planning and establishing goals—from both an enterprise and center perspective—to ensure alignment and objectives that complement and support one another. Such planning may be complemented with forecasting and scheduling of the workforce to ensure optimum service levels. Recording and measuring performance may also be utilized, leveraging quality monitoring/call recording to assess service quality and the customer experience.

The embodiments disclosed herein can be implemented in hardware, software, firmware, or a combination thereof. At least one embodiment, disclosed herein is implemented in software and/or firmware that is stored in a memory and that is executed by a suitable instruction execution system. If implemented in hardware, as in an alternative embodiment embodiments disclosed herein can be implemented with any or a combination of the following technologies: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

One should note that the flowcharts included herein show the architecture, functionality, and operation of a possible implementation of software. In this regard, each block can be interpreted to represent a module, segment, or portion of code, which comprises one or more executable instructions for implementing the specified logical function(s). It should also be noted that in some alternative implementations, the functions noted in the blocks may occur out of the order and/or not at all. For example, two blocks shown in succession may in fact be executed substantially concurrently or the blocks may sometimes be executed in the reverse order, depending upon the functionality involved.

One should note that any of the programs listed herein, which can include an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of this disclosure can include embodying the functionality described in logic embodied in hardware or software-configured mediums.

One should also note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of this disclosure. Many variations and modifications may be made to the above-described embodiment(s) without departing substantially from the spirit and principles of the disclosure. All such modifications and variations are intended to be included herein within the scope of this disclosure.

Therefore, at least the following is claimed:

1. A system for recording data from a communication, comprising:
    a controller component configured to receive control data associated with a communication between a first communications device and a second communications device;
    a switching component including a first receive port, a second receive port, a first transmit port and a second transmit port, the switching component configured to receive media data associated with the communication via the first receive port, the switching component further configured to send the received media data to the second receive port via the first transmit port, the switching component further comprising the second transmit port, wherein the first transmit port and the second receive port are coupled via a connection line; and
    a gateway component passively coupled to the connection line, the gateway component configured to receive at least a portion of the control data, the gateway component further configured to receive media data associated with the communication,
    wherein the coupling of the gateway component and the connection line is a non-terminating point.

2. The system of claim 1, wherein the gateway component is further configured to send at least a portion of the media data to a recorder.

3. The system of claim 1, wherein the gateway component is coupled to a wide area network, wherein the gateway component is configured to send at least a portion of the media data to at least one recorder via the wide area network.

4. The system of claim 1, wherein the gateway component is coupled to a Wide Area Network, wherein the gateway component is configured to send at least a portion of the control data to at least one recorder via the Wide Area Network.

5. The system of claim 1, wherein the controller component is configured to receive control data via a Signaling System 7 (SS7) protocol.

6. The system of claim 1, wherein the media data is configured for communication in a Time Division Multiplexing (TDM) environment.

7. The system of claim 1, wherein the media data is configured for communication in an Internet Protocol environment.

8. The system of claim 1, further comprising at least one recorder configured to receive at least a portion of the media data, wherein the at least one recorder is coupled to the gateway component via wide area network.

9. A system for recording data from a communication, comprising:
    a controller component configured to receive control data associated with a communication between a first communications device and a second communications device;
    a switching component including a first receive port, a second receive port, a first transmit port and a second transmit port, the switching component configured to receive media data associated with the communication and send the received media data to the first receive port via the first transmit port, wherein the first transmit port and the first receive port are coupled via a connection line; and
    a gateway component passively coupled to the switching component at the connection line, the gateway component configured to receive at least a portion of the control data, the gateway component further configured to receive media data associated with the communication.

10. The system of claim 9, further comprising a switching component configured to receive the media data via a first receive port, the switching component further configured to send the received media data to a second receive port via the first transmit port, the switching component further comprising the second transmit port, wherein the first transmit port and the second receive port are coupled via a connection line.

11. The system of claim 10, wherein the gateway component is coupled to the switching component via the connection line.

12. The system of claim 9, wherein the control data is received via a Signaling System 7 (SS7) protocol.

13. The system of claim 9, further comprising a recorder coupled to the gateway component, the recorder configured to receive at least a portion of the media data.

14. The system of claim 9, wherein the media data is configured for communication in a Time Division Multiplexing (TDM) environment.

15. The system of claim 9, wherein the media data is configured for communication in an Internet Protocol (IP) environment.

16. The system of claim 9, wherein at least a portion of the media data is sent to a recorder controller, the recorder controller configured to determine a recorder for recording the media data.

17. A system for recording data from a communication, comprising:
   controller logic configured to receive control data associated with a communication;
   switching logic executing at a switching component that includes a first receive port, a second receive port, a first transmit port and a second transmit port, the switching component configured to receive media data associated with the communication and send the received media data to the first receive port via the first transmit port, wherein the first transmit port and the first receive port are coupled via a connection line; and
   gateway logic passively coupled to the switching component at the connection line, the gateway component configured to receive media data associated with the communication.

18. The system of claim 17, further comprising switching logic configured to receive the media data via the first receive port, the switching component further configured to send the received media data to the second receive port via the first transmit port, the switching component further comprising the second transmit port, wherein the first transmit port and the second receive port are coupled via a connection line.

19. The system of claim 17, wherein the gateway logic is coupled to the switching logic via the connection line.

20. The system of claim 17, wherein the control data is received via a Signaling System 7 (SS7) protocol.

21. The system of claim 17, further comprising recording logic coupled to the gateway logic, the recording logic configured to receive at least a portion of the media data.

22. The system of claim 17, wherein the gateway component is further configured to receive at least a portion of the control data.

* * * * *